(12) United States Patent
Sinclair et al.

(10) Patent No.: US 7,585,175 B2
(45) Date of Patent: Sep. 8, 2009

(54) ELONGATED ELECTRICAL CONDUCTOR THAT IS ADAPTED FOR ELECTRICALLY CONNECTING WITH AN ELECTRICAL CONTACT

(75) Inventors: John Ashton Sinclair, Killback via Wingham (AU); Jaroslav Emil Haba, Erina (AU); Kevin Truskett, Kincumber (AU); Jeffrey Allan Jackson, Gisborne (AU)

(73) Assignee: Power & Data Corporation Pty Ltd., Kirribilli, NSW (AU)

( * ) Notice: Subject to any disclaimer, the term of this patent is extended or adjusted under 35 U.S.C. 154(b) by 412 days.

(21) Appl. No.: 10/539,655

(22) PCT Filed: Dec. 18, 2003
(Under 37 CFR 1.47)

(86) PCT No.: PCT/AU03/01691

§ 371 (c)(1),
(2), (4) Date: Jun. 14, 2005

(87) PCT Pub. No.: WO2004/055951

PCT Pub. Date: Jul. 1, 2004

(65) Prior Publication Data

US 2006/0116011 A1 Jun. 1, 2006

(30) Foreign Application Priority Data

Dec. 18, 2002 (AU) ............................ 2002953429

(51) Int. Cl.
*H01R 25/00* (2006.01)
(52) U.S. Cl. ........................................ 439/111; 439/513
(58) Field of Classification Search ................. 439/510, 439/512, 513, 511
See application file for complete search history.

(56) References Cited

U.S. PATENT DOCUMENTS 3,582,864 A * 6/1971 Sullivan ...................... 439/510

(Continued)

FOREIGN PATENT DOCUMENTS

DE 195 13 063 A1 10/1996

(Continued)

OTHER PUBLICATIONS

International Search Report issued in corresponding international application PCT/AU2003/001691.

(Continued)

*Primary Examiner*—Tho D. Ta
*Assistant Examiner*—Travis Chambers
(74) *Attorney, Agent, or Firm*—Intellectual Property Law Offices of Joel Voelzke, APC

(57) ABSTRACT

An elongate electrical conductor (2) is disclosed that is adapted for electrically connecting with an electrical contact, the conductor (2) includes a longitudinally extending elongate body (61) for defining a first contact surface (62); and a plurality of longitudinally spaced apart ribs (66) that extend from the body (61) to respective free ends (67) that are spaced apart from the first contact surface (62) for allowing the contact to be progressed between the body (61) and one or more of the ribs (66), each rib (66) including a respective second contact surface (68) that is opposed with the first surface (62) wherein, upon progression of the contact between the body (61) and the one or more ribs (66), the first surface (62) and the respective one or more second surfaces (68) are resiliently biased into engagement with the contact.

22 Claims, 32 Drawing Sheets

U.S. PATENT DOCUMENTS

| | | | | |
|---|---|---|---|---|
| 3,951,497 A | * | 4/1976 | Balzano et al. | 439/510 |
| 4,150,864 A | * | 4/1979 | Walter | 439/510 |
| 4,493,516 A | | 1/1985 | Attema | |
| 5,803,755 A | | 9/1998 | Kuchar et al. | |
| 6,039,584 A | | 3/2000 | Ross | |

FOREIGN PATENT DOCUMENTS

| | | |
|---|---|---|
| EP | 0544031 B1 | 6/1993 |
| EP | 1283578 A1 | 2/2003 |
| GB | 2132825 A | 7/1984 |
| WO | WO 9303517 | 2/1993 |
| WO | WO 9612327 | 4/1996 |
| WO | WO 98/11634 | 3/1998 |
| WO | WO 0109988 A1 | 2/2001 |

OTHER PUBLICATIONS

English language translation of office action in corresponding Ukraine Patent Application 2005 07048.

* cited by examiner

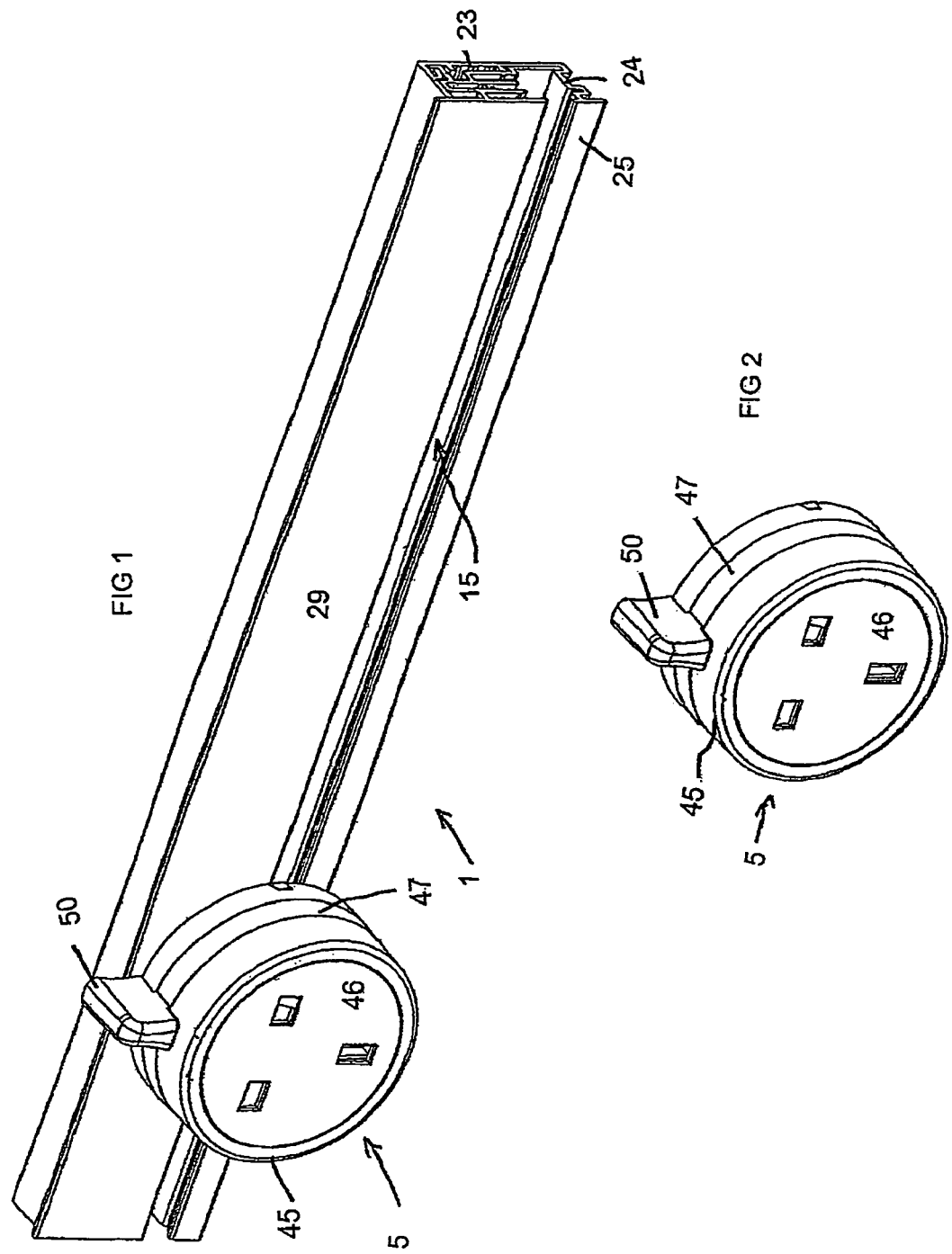

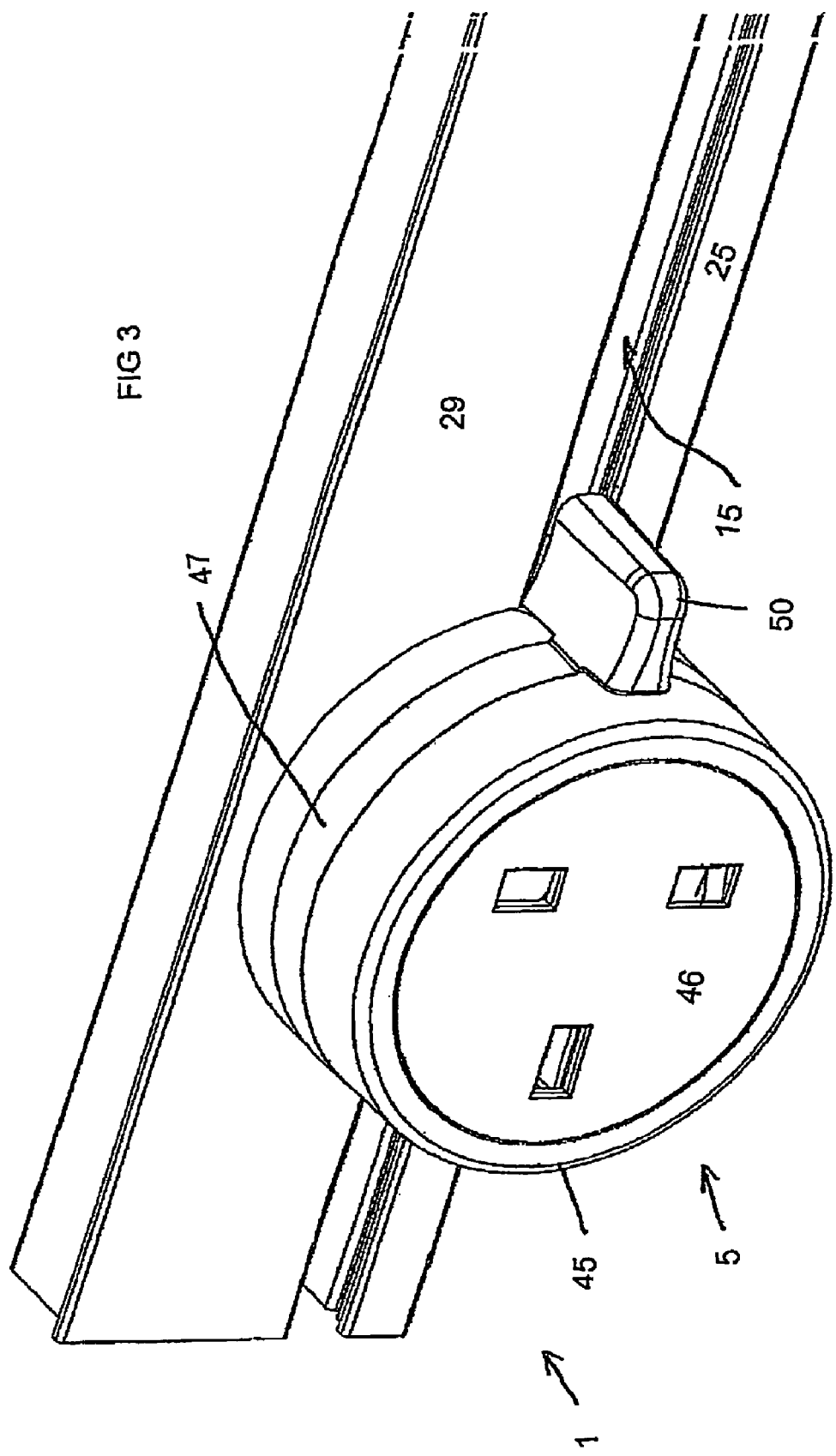

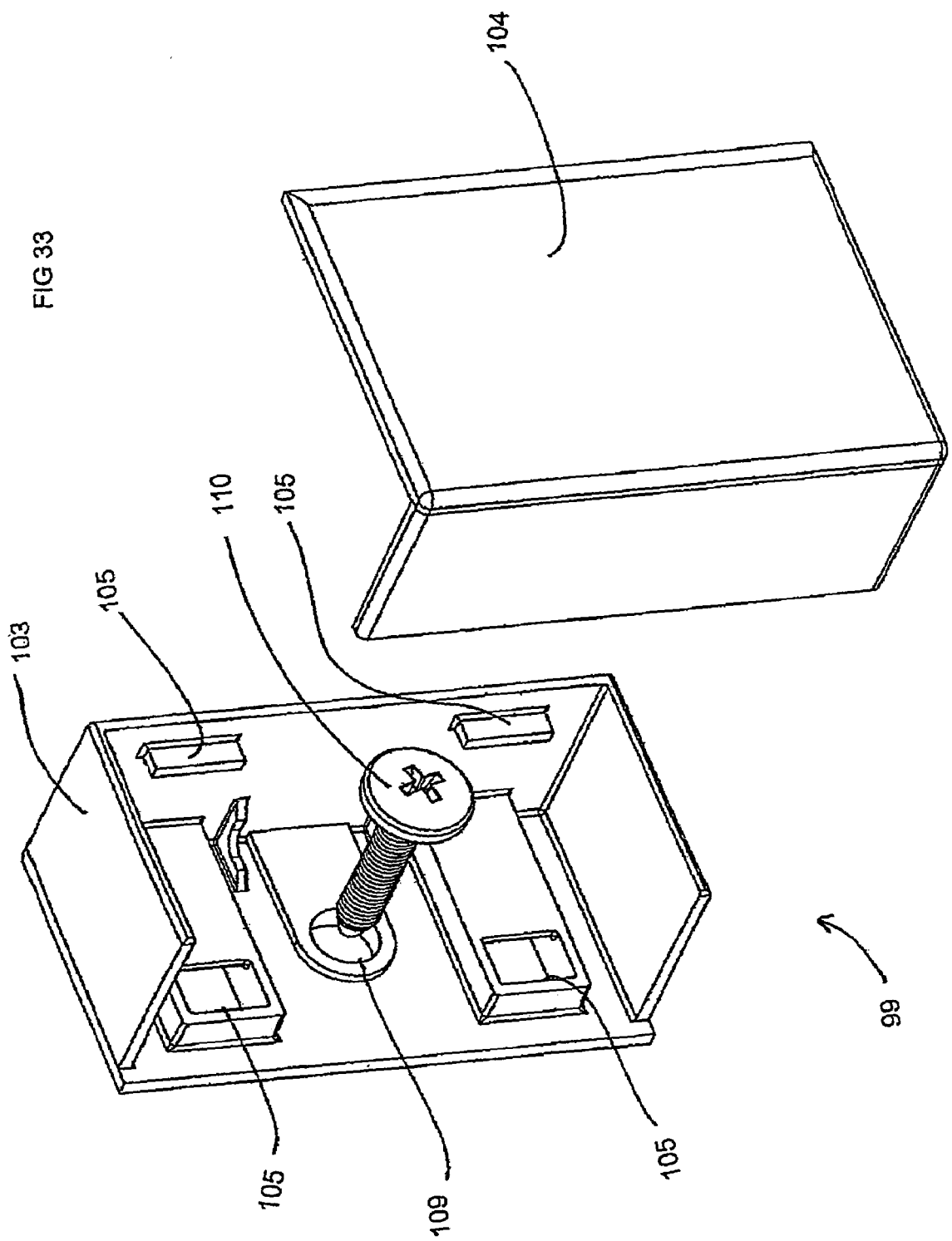

ELONGATED ELECTRICAL CONDUCTOR THAT IS ADAPTED FOR ELECTRICALLY CONNECTING WITH AN ELECTRICAL CONTACT

FIELD OF THE INVENTION

The present invention relates to an elongate electrical conductor and in particular to an elongate electrical conductor that is adapted for electrically connecting with an electrical contact.

The invention has been developed primarily for providing common power and communications lines in domestic, commercial and public buildings and will be described hereinafter with reference to those applications. It will be appreciated, however, that the invention is not limited to those fields of use and is also suitable for providing only power or only communication lines, whether that be in the above categories of buildings or otherwise.

BACKGROUND OF THE INVENTION

Any discussion of the prior art throughout the specification should in no way be considered as an admission that such prior art is widely known or forms part of common general knowledge in the field.

Recent prior elongate electrical conductors are disclosed in U.S. Pat. Nos. 6,309,229 and 6,395,987, both of which are in the name of the present inventor. While the conductors disclosed in these patents provide possible solutions to the problems that are identified in the specification, they are relatively complex and difficult to manufacture, as well as occupying considerable volume for the current carrying capacity that is accommodated.

These types of conductors are typically formed from a copper sheet and, for a unit length and current carrying capacity, are heavy and therefore relatively expensive and difficult to transport. Moreover, the production of the conductors results in the generation of considerable waste material.

SUMMARY OF THE INVENTION

It is an object of the present invention to overcome or ameliorate at least one of the disadvantages of the prior art, or to provide a useful alternative.

According to a first aspect of the invention there is provided an elongate electrical conductor that is adapted for electrically connecting with an electrical contact, the conductor including:

a longitudinally extending elongate body for defining a first contact surface; and a plurality of longitudinally spaced apart ribs that extend from the body to respective free ends that are spaced apart from the first contact surface for allowing the contact to be progressed between the body and one or more of the ribs, each rib including a respective second contact surface that is opposed with the first surface wherein, upon progression of the contact between the body and the one or more ribs, the first surface and the respective one or more second surfaces are resiliently biased into engagement with the contact.

In a preferred form, the spacing between the free ends and the first contact surface is greater than the spacing between the first and second contact surfaces.

Preferably, the ribs are resiliently mounted to the body. More preferably, the ribs are resilient.

Preferably also, the body is a conductive sheet having two opposite elongate longitudinally extending edges, wherein the ribs extend from one of the edges. In some embodiments, the body includes a further conductive strip that extends from the other of the edges. The further conductive strip is preferentially used in high current applications.

In a preferred form, adjacent free ends are mechanically connected to collectively increase the resilient bias. More preferably, the adjacent free ends are mechanically connected by respective intermediate integrally formed segments. Even more preferable, the segments collectively define with the free ends an engagement face for guiding the progression of the contact into biased engagement with the first and second surfaces. In the preferred embodiments, the engagement face is continuous.

Preferably, the engagement face is opposed with and inclined away from the first surface. More preferably, the engagement face extends between an inner edge and an outer edge that terminates opposite the other edge.

Preferably also, when the first and second surfaces are biased into engagement with the contact, the inner edge abuts the contact. More preferably, the ribs restrain longitudinal movement of the contact.

In a preferred form, the conductor is formed from a continuous conductive sheet that is folded upon itself along a longitudinal fold line. More preferably, the sheet is punched to form the ribs. However, in other embodiments, the sheet is cut or otherwise formed.

Preferably, the first contact surface is substantially planar and the second contact surfaces are arcuate. In some embodiments the second contact surfaces include a compound arc.

According to a second aspect of the invention there is provided an elongate electrical conductor that is adapted for electrically connecting with an electrical contact, the conductor including:

a longitudinally extending elongate first body for defining a substantially planar contact surface; and a longitudinally extending elongate second body being mounted to the first body for defining an arcuate contact surface that is opposed with the planar surface wherein, upon progression of the contact between the first and second bodies, the planar and the arcuate surfaces are resiliently biased into engagement with the contact.

Preferably, the arcuate contact surface is segmented. More preferably, the second body includes a plurality of longitudinally spaced apart ribs that extend from the first body to respective free ends which collectively define the arcuate surface. Even more preferably, the free ends are mechanically connected. In the preferred embodiments the free ends are mechanically interconnected by respective intermediate integrally formed segments.

Preferably, the first body is substantially planar and includes two opposite faces, one of which defines the planar contact surface. More preferably, the second body is arcuate and includes opposite convex and a concave faces, the formed defining the arcuate contact surface.

According to a third aspect of the invention there is provided a conduit for an elongate electrical conductor that is adapted for electrically connecting with an electrical contact, the conduit including:

a longitudinally extending housing;

one or more mounting formations disposed within the housing for captively retaining the conductor to the housing;

an opening in the housing for receiving the contact and thereby allowing the contact to be brought into engagement with the conductor; and a closure that is mounted to the housing for moving between an open configuration and a closed configuration with respect to the opening when the contact is and is not received within the opening respectively.

Preferably, the closure is mounted to the housing for rotation between the open and closed configurations. More preferably, the closure is hinged to the housing. Even more preferably, the closure is resiliently biased toward the closed configuration.

In some embodiments the closure is resiliently biased toward the closed configuration. Preferably, the closure includes an internal biasing element for providing the resilient bias. In an embodiment, the biasing element is a leaf spring.

In some embodiments, the closure includes a longitudinal line of weakness about which it is resiliently deformed from the closed configuration.

Preferably also, the contact is part of a contact assembly and, as the assembly is progressed into the opening, the closure is moved toward to open configuration. More preferably, the contact assembly engages the closure to effect progression toward the open configuration.

In a preferred form, the mounting formation is a retaining channel that extends continuously through the housing. More preferably, the channel includes a continuous open end for receiving the contact. More preferably, the open end is downwardly facing. In the preferred embodiments, the open end defines the bottom of the channel.

Preferably, the housing includes a plurality of spaced apart channels for captively retaining respective conductors. More preferably, the channels are parallel. In the preferred embodiment, the channels longitudinally coextend and are transversely spaced apart.

Preferably also, the housing is extruded.

In a preferred form, the closure, in the closed configuration, extends across the opening. More preferably, the opening extends longitudinally and the conduit includes a plurality of closures that, in the closed configuration, collectively extend longitudinally across substantially all of the opening. Even more preferably, movement of one closure between the open and closed configuration occurs independently of movement of any other of the closures. In the preferred embodiment the closures are modular.

In some embodiments the closures are formed from an elongate strip and interposed with longitudinally running slots. In other embodiments the housing includes a channel on its rear face for use with adhesive tape for fixing the housing to a carrying surface. Preferably the housing includes an internal cavity for housing the head of a fixing means for fixing the housing to a carrying surface.

Preferably, the closure is mounted inside the housing and, in the closed configuration, extends upwardly from the housing and across the opening. More preferably, the closure is hinged at or adjacent to the housing wherein the movement between the open and closed configurations occurs within the housing. In the preferred embodiments, the opening includes two opposite edges and the closure extends from a mounting end that is hingedly engaged with the housing adjacent to one of the opposite edges, to a free end that, in the closed configuration, is disposed adjacent to the other of the opposite edges.

Preferably also, the mounting formation includes a locating formation for orientating the conductor for resilient deformation upon engagement with the contact. More preferably, the conductor includes a plurality of engagement faces for engaging with the contact, and the locating formation orientates the engagement faces for resiliently deforming into engagement with the contact. Even more preferably, the locating formation is a protrusion that extends from the mounting formation.

In other embodiments, the mounting formation includes a channel having an open end defined by the opening. More preferably, the opening is downwardly facing. Even more preferably, the closure is a flap that, in the closed configuration, extends across substantially all of the opening and which is resiliently deformed by the contact into the open configuration.

According to a fourth aspect of the invention there is provided a conduit for an elongate electrical conductor having two opposed engagement elements that are adapted for electrically connecting with an electrical contact, one of the elements being substantially planar and the other being arcuate, the conduit including:

a longitudinally extending housing;

one or more mounting formations disposed within the housing for captively retaining the conductor to the housing;

an opening in the housing for receiving the contact and thereby allowing the contact to be brought into engagement with the conductor; and one or more locating formations associated with the mounting formations for orientating the conductor to ensure that the substantially planar engagement face is inclined with respect to the contact.

Preferably, the conduit includes a closure that is mounted to the housing for moving between an open configuration and a closed configuration with respect to the opening when the contact is and is not received within the opening.

Preferably also, the arcuate engagement face includes a compound arc.

In a preferred form, the mounting formations captively retain the conductor within the housing. For typical domestic AC voltages this is required to ensure for the safety of persons in the vicinity. However, for low voltage DC applications the design of the conduit is able to accommodate the conductor being partially or substantively disposed outside of the housing.

In some embodiments the conduit is arranged to carry three or more elongate electrical conductors. Preferably, the conductors are spaced apart from each other to provide a plurality of electrical circuits.

According to a fifth aspect of the invention there is provided a conduit for an elongate electrical conductor that is adapted for electrically connecting with an electrical contact, the conduit including:

a longitudinally extending housing;

an open ended channel disposed within the housing for captively retaining the conductor within the housing;

an opening in the housing for receiving the contact and thereby allowing the contact to be brought into engagement with the conductor; and a closure that is disposed within the housing adjacent to the open ended channel for moving between a closed configuration and an open configuration for providing a barrier to unintended access to the conductor.

Preferably, the closure is moved into the open configuration when the contact is brought into engagement with the conductor. More preferably, only that portion of the closure adjacent to the contact is moved into the open configuration.

According to a sixth aspect of the invention there is provided a contact assembly for electrically connecting with a plurality of conductors contained within a conduit, the contact including:

a housing that is movable into engagement with the conduit; and a plurality of contact formations mounted to the housing and which are movable into engagement with respective conductors in a predetermined sequence.

Preferably, the housing is movable into releasable engagement with the conduit and the contact formations are movable into releasable engagement with the respective conductors.

Preferably also, the contact formations include at least two pins, wherein one of the pins protrudes further from the housing than the other. More preferably, the contact formations include three parallel pins that extend transversely from the housing and terminate at free ends that are transversely spaced apart.

In a preferred form, the contact includes at least two parallel pins and the relative transverse offset between the pins and the respective conductors is such as to provide the predetermined sequence.

Preferably, the contact assembly includes an active pin and a neutral pin, and the predetermined sequence comprises the neutral pin and then the active pin engaging the respective conductors. More preferably, the contact assembly includes an active pin, a neutral pin and an earth pin, and the predetermined sequence comprises the earth pin and then the neutral pin and the active pin engaging the respective conductors. Even more preferably, the neutral pin and the active pin substantially simultaneously engage with respective conductors. In other embodiments, however, the predetermined sequence comprises the earth pin and then the neutral pin and then the active pin engaging the respective conductors.

Preferably also, the pins are movable out of engagement with the respective conductors, that movement occurring in the reverse of the predetermined sequence.

In some embodiments the pins are biased to move out of engagement with the respective conductors. In other embodiments the pins are connected to a cam arranged to bias the pins into engagement with the respective conductors. In other embodiments the pins are provided with connectors for connecting to respective cables for conducting power or signals to or from the conductors. Preferably the pins are integrally formed with the housing and respective cables for conducting power or signals to or from the conductors. In some embodiments the pins are connected to respective socket formations for conducting power or signals to or from the conductors. In other embodiments the pins are provided in the reverse order to enable the contact assembly to be brought into engagement with the conductors from an alternative direction. In further embodiments the pins are arranged for engagement with a sub-set of the conductors in the conduit. In a preferred embodiment the housing includes a guide to indicate to a user that the contact assembly is in engagement with the respective conductors. Preferably, the guide provides a visual indication to the user. More preferably, the housing includes a visually distinct portion, and the guide includes a window through which the user is able to view the portion when the contact assembly is in engagement with the respective conductors.

According to a seventh aspect of the invention there is provided an elongate electrical conductor that is adapted for electrically connecting with an electrical contact, the conductor including:

a longitudinally extending elongate conductive sheet having a first face and a second face opposite to the first face, wherein the first face defines a first contact surface; and a plurality of longitudinally spaced apart ribs that extend transversely from the sheet and back along at least a portion of the first contact surface but not along the second face, each rib including a respective second contact surface wherein, upon progression of the contact between the sheet and the one or more ribs, the first surface and the respective one or more second surfaces are resiliently biased into engagement with the contact.

Preferably, the faces are joined along a first common longitudinal edge and a second common longitudinal edge and the ribs extend from the first edge and terminate in respective free ends. More preferably, the second contact surfaces are disposed intermediate the first edge and the respective free ends. Even more preferably, the free ends terminate between the first and second edges. In some embodiments the free ends extend beyond the second edge. However, the free ends do not extend around the second edge.

According to an eighth aspect of the invention there is provided a contact assembly for electrically connecting with a plurality of conductors contained within a conduit, the contact including:

a housing that is movable into engagement with the conduit;

a plurality of contact formations mounted to the housing and which are movable into engagement with respective conductors; and a guide that is mounted to the housing and which provides an external indication that the contact formations are in engagement with the respective conductors.

In an embodiment, the housing includes a visually distinct portion, and the guide includes a window that overlies and through which the portion is viewable when the contact formations are in engagement with the respective conductors. Preferably, the portion is otherwise substantially obscured from view.

BRIEF DESCRIPTION OF THE DRAWINGS

Preferred embodiments of the invention will now be described, by way of example only, with reference to the accompanying drawings in which:

FIG. 1 is a perspective view of a conduit according to the invention in combination with a contact assembly, also according to the invention, that is mounted to the conduit in a movable configuration;

FIG. 2 is a perspective view of the contact assembly of FIG. 1;

FIG. 3 is an enlarged view of the conduit and contact assembly of FIG. 1, with the contact in an operative configuration;

FIG. 33 is an exploded perspective view of the end cap of FIG. 31.

DESCRIPTION OF THE PREFERRED EMBODIMENTS

Figure 4:
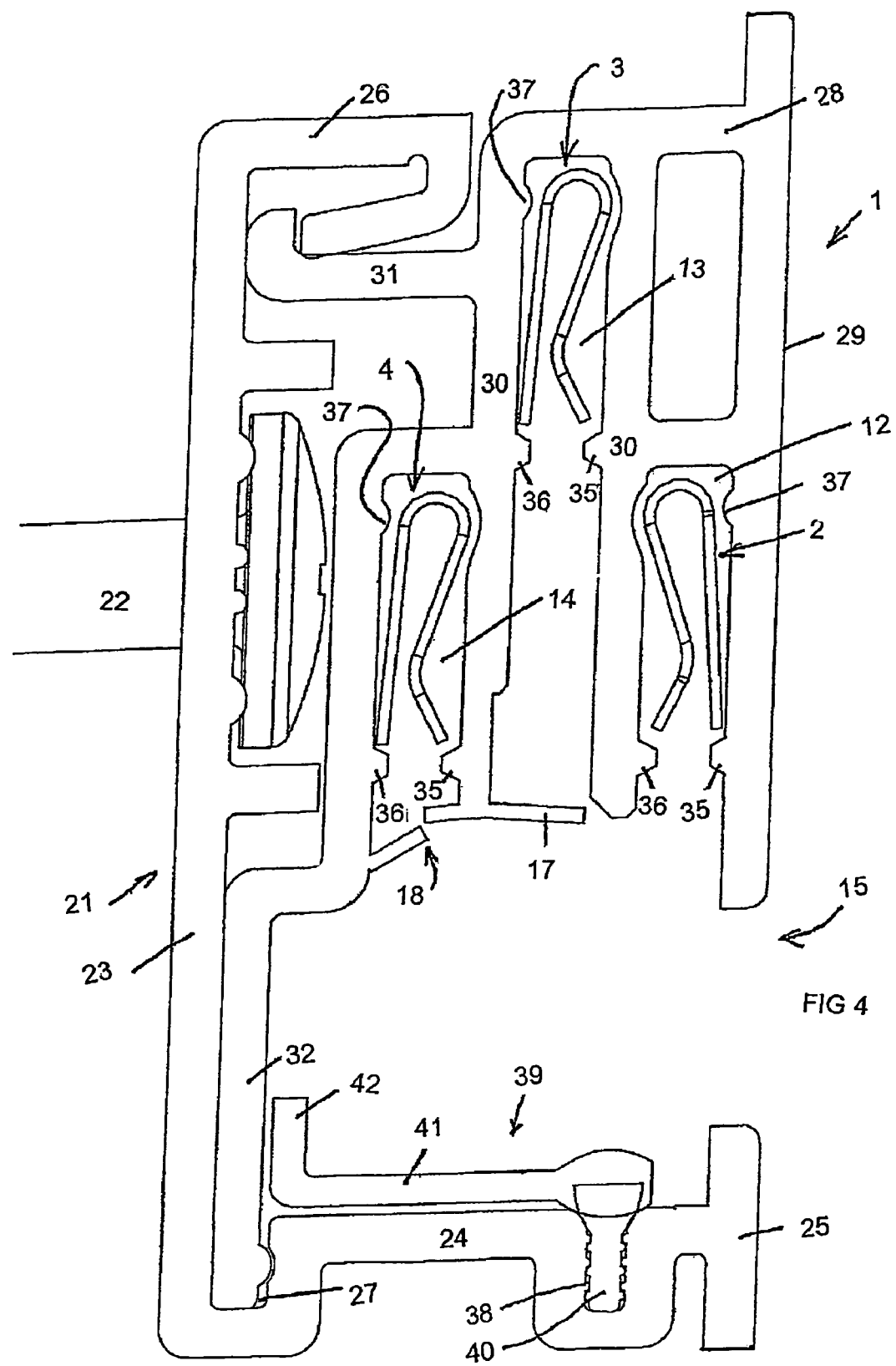
FIG. 4 is an enlarged side view of the conduit of FIG. 1.
Figure 17:
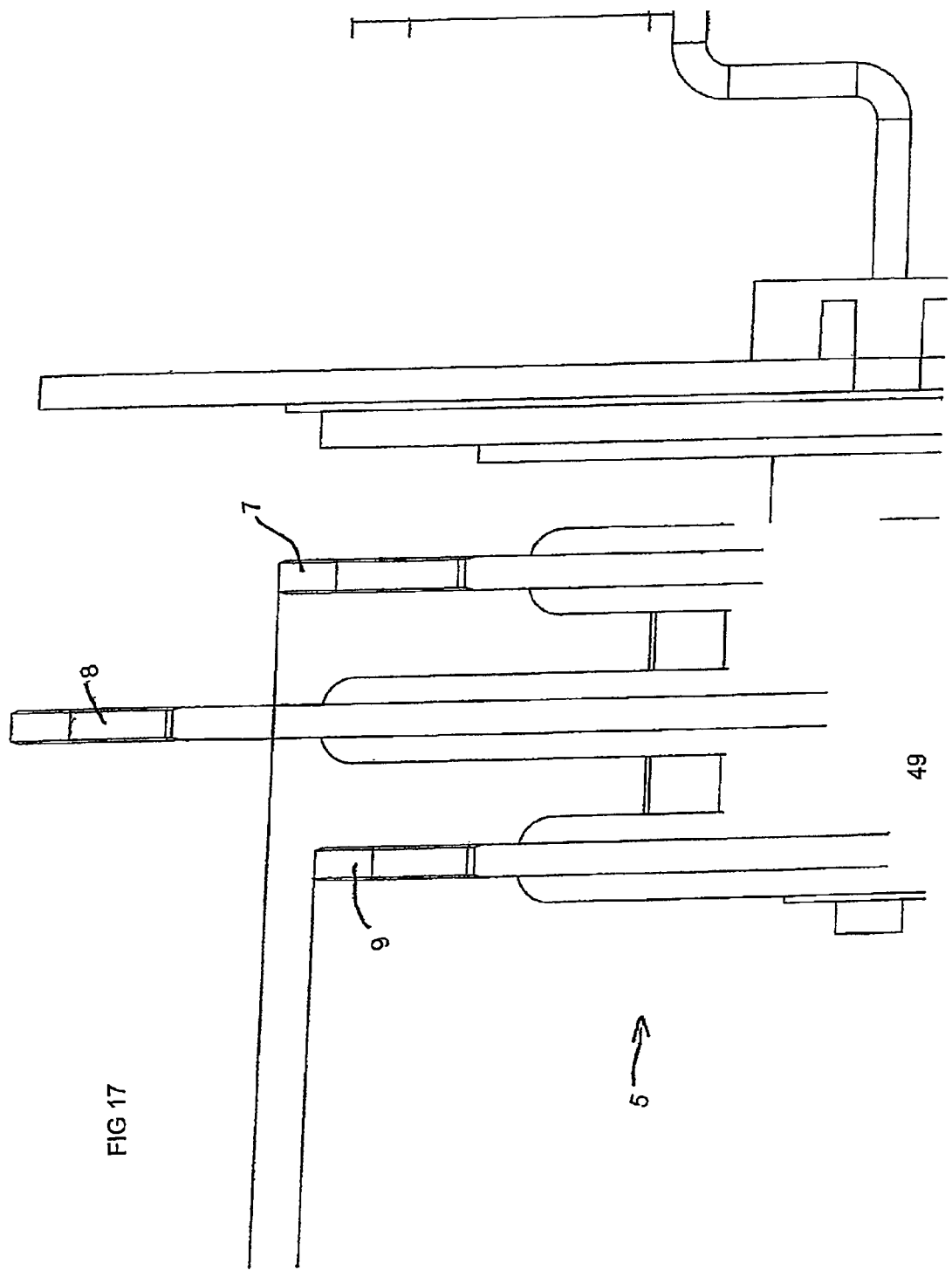
FIG. 17 is a side view of the contact assembly of FIG. 1 showing the contact formations.

Referring to FIGS. 1 to 10 and FIGS. 15 and 17, and particularly to FIGS. 1, 4 and 17, there is illustrated an elongate insulating conduit 1 for three generally parallel elongate electrical conductors 2, 3 and 4 that are adapted for electrically connecting a contact assembly 5 having corresponding electrical contacts in the form of pins 7, 8 and 9. Conduit 1 includes a longitudinally extending extruded plastic housing 11 of substantially consistent cross-sectional shape. Three open-ended channels 12, 13 and 14 are disposed within housing 11 for captively retaining respective conductors 2, 3 and 4 within the housing. An elongate longitudinally extending opening 15 in housing 11 receives assembly 5 and thereby allows pins 7, 8 and 9 to be brought into engagement with respective conductors 2, 3 and 4. As best shown in FIG. 4, two resiliently deformable plastics closures 17 and 18 are disposed within housing 11 adjacent to open ended channels 13 and 14 for moving between a closed configuration, as shown, and an open configuration for providing a barrier to unintended access to conductors 3 and 4.

Housing 11, in this embodiment, is a three-piece construction and includes a rigid plastics mounting bracket 21 that is attached to a wall or other support element that the housing is to extend along or between. The attachment, in this embodiment, is by a plurality of longitudinally spaced metal screws 22 that extend through apertures (not shown) in bracket 21. In other embodiments, the attachment is affected by other devices, for example, bolts, adhesive, rivets and the like.

Bracket 21 includes a rear plate 23, a base 24 that extends forwardly from the bottom of plate 23, and a front plate 25 that is extends substantially normally from base 24. Plate 23 includes a snap-lock fitting 26, while plate 23 and base 24 collectively define a retention channel 27.

Plate 23, base 24, plate 25, fitting 26 and channel 27 are integrally formed.

Housing 11 also includes an extruded plastic front bracket 28 having a front plate 29 that is spaced apart from and extends in the same plane as plate 25 for defining opening 15. A rigid wall assembly 30 extends rearwardly from plate 29 and, together with that plate, define channels 12, 13 and 14. Assembly 30 also includes a snap-lock fitting 31 and a locking post 32 that respectively complementarily interact with fitting 26 and channel 27.

Plate 29, assembly 30, fitting 31 and post 32 are integrally formed.

Channels 12, 13 and 14 include respective retention protrusions in the form of pairs of opposed longitudinally extending ridges 35 and 36 that extend toward each other to define the open end of the respective channels. These ridges retain conductors 2, 3 and 4 in the respective channels, and include lower bevelled edges to guide pins 7, 8 and 9 into the channels.

The channels also include mounting formations, in the form of respective abutments 37 and recesses 55, that shape the interior of the channels for ensuring the respective conductors are inclined with respect to the pins. This functionality will be described in more detail below.

Figure 9:
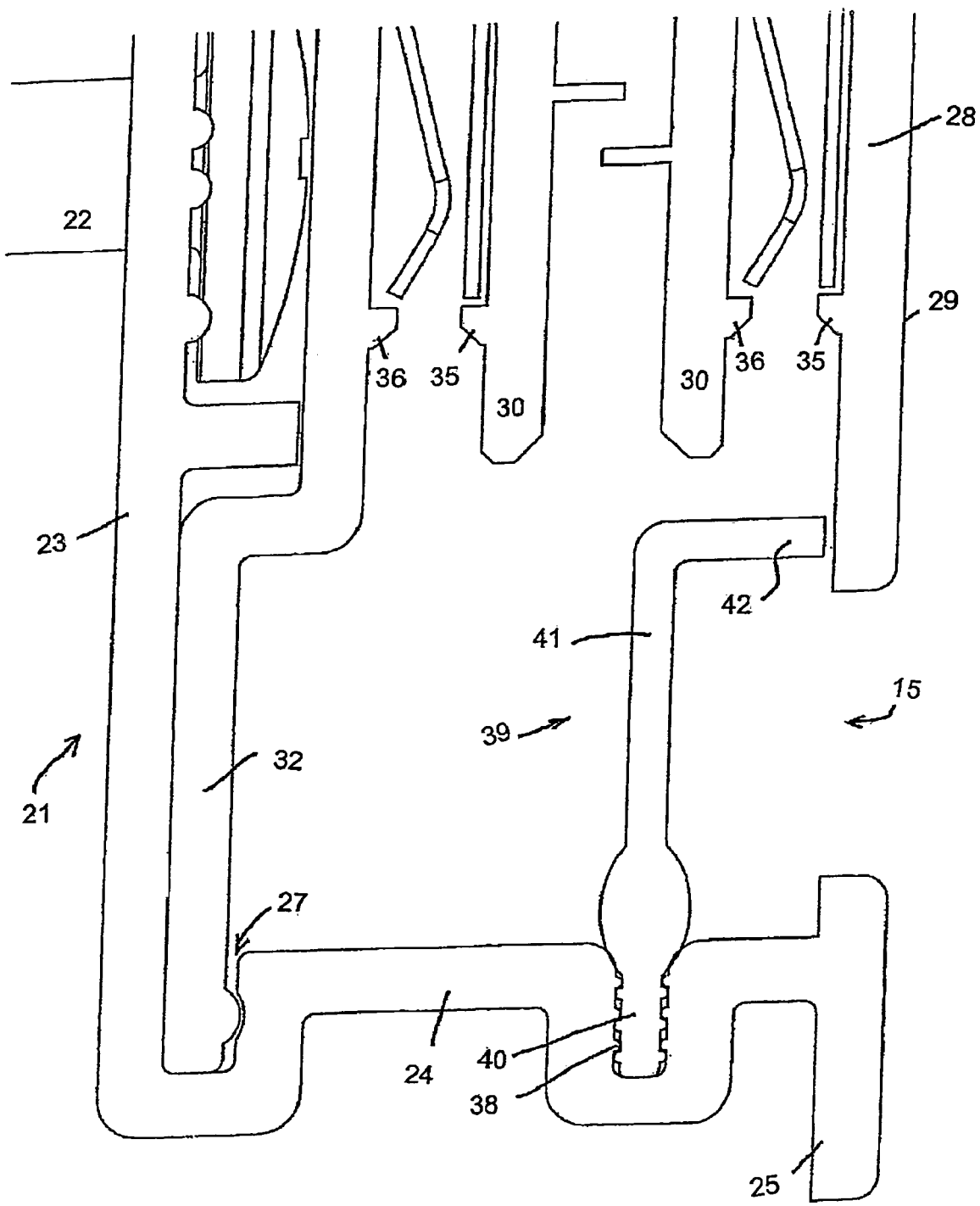
FIG. 9 is an enlarged side view of the conduit of FIG. 1 illustrating a movable closure in a closed configuration.
Figure 10:
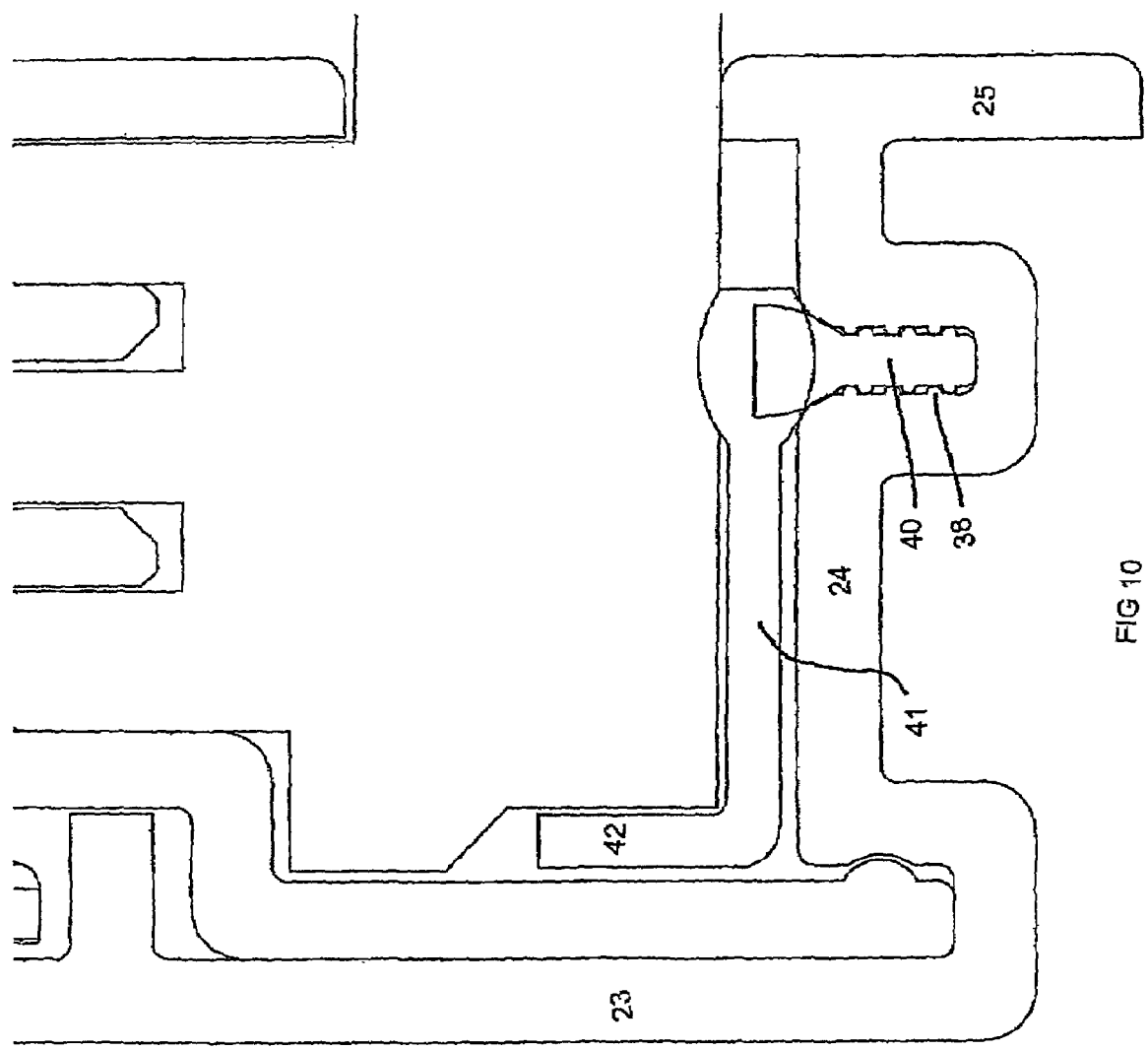
FIG. 10 is a view similar to that of FIG. 9 showing the closure in the open configuration.

Base 24 includes a mounting formation in the form of a longitudinal channel 38 that coextends with housing 11 and which includes pairs of spaced apart internal abutments. An extruded plastic closure 39 extends within housing 11 for movement between an open configuration, as shown in FIG. 4, and a closed configuration, as shown in FIG. 9. Closure 39 has a longitudinal length of about 50 mm and includes a support formation, in the form of a ribbed spigot 40, that is complementarily fixedly mounted within channel 38 in an interference fit.

Closure 39 also includes a shutter 41 that is hinged to spigot 40 for movement between the open configuration, where the shutter is substantially horizontal, and the closed configuration, where the shutter is substantially vertical. The free end of shutter 41 includes an integrally formed peak 42 that extends normally away from the shutter to provide additional resistance to ingress of unwanted items into housing 11.

Figure 18:
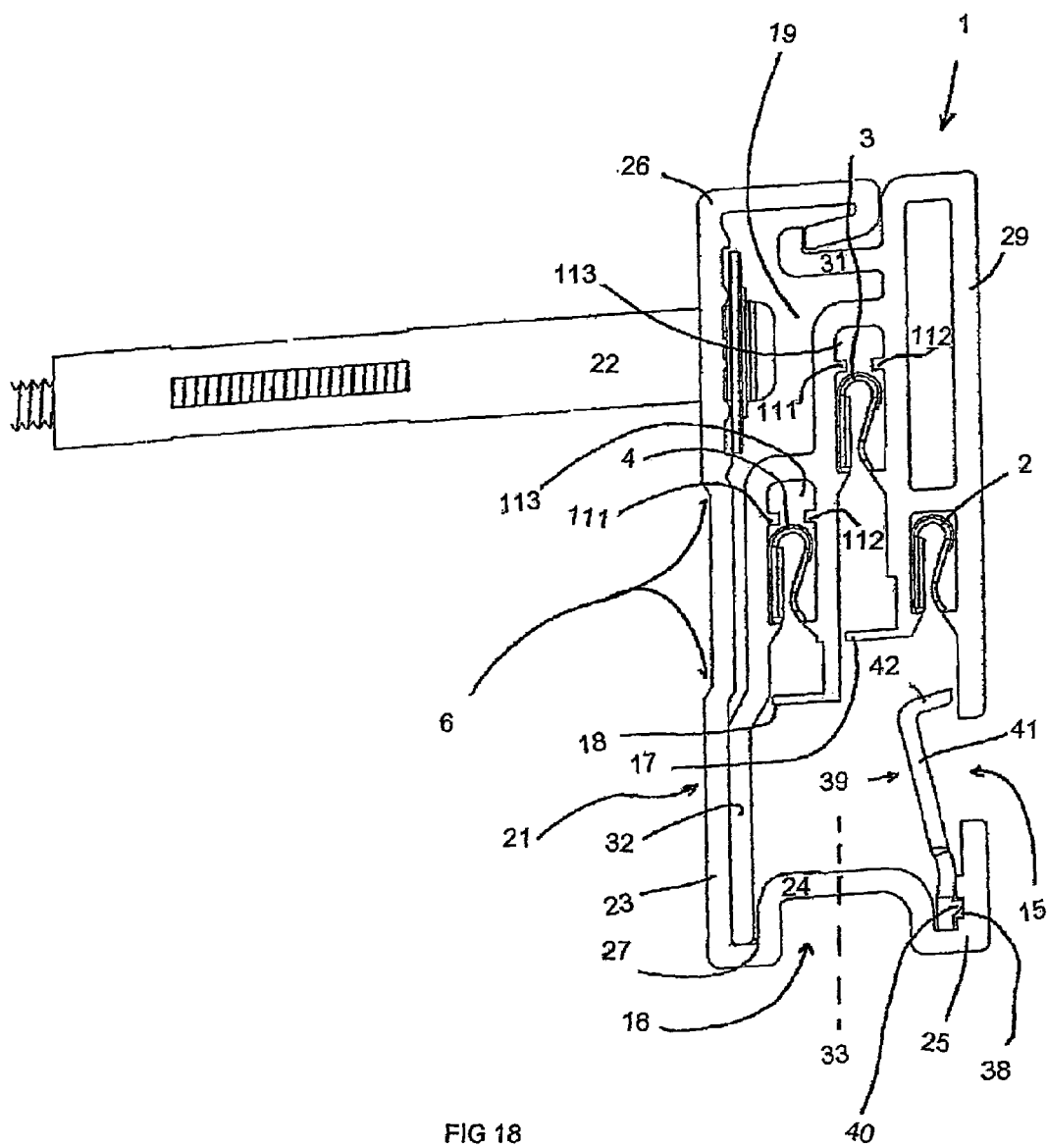
FIG. 18 is an enlarged side view of the conduit of FIG. 1.

FIG. 18 shows an alternative embodiment of the housing 11, in which the snap lock fitting 26 is extended outwardly so as to define a larger space or cavity 19 between the mounting bracket 21 and the rearward face of the front plate 29. The function of the cavity 19 is to provide space to accommodate the various types or size of fixing bolt 22 that can be used to mount the conduit 1. A longitudinally extending channel or groove 6 is also formed in the rearward surface of the mounting bracket 21 above the rear plate 23. The groove 6 is arranged to accept double sided adhesive tape or other adhesive strip for mounting the conduit 1 to a surface. The mounting methods using the groove 6 or the bolt 22 are used in combination in some embodiments and separately in other embodiments.

A longitudinal channel 16 is formed in the lower wall of the base 24 of the mounting bracket 21, which is arranged to be engaged with a corresponding ridge (not shown) on the surface on which the conduit 1 is mounted. The engagement of the ridge in the channel 16 provides and extra fixing point for the mounting bracket 21 when used in combination with a bolt 22 and/or adhesive tape and the groove 6. In a further alternative, the lower wall of the base 24 is formed flush, that is, the channel 16 is omitted. This provides a further fixing point extending downwardly along axis 33. The fixing element in this embodiment is a bolt but in other embodiments the bolt is replaced with a fixing element such as a bolt, screw, nail, staple or rivet placed thought a hole made in the base 24 or with adhesive, adhesive tape or the like.

The longitudinal length of housing 11 varies depending upon the site in which it is installed. Typically, that longitudinal length is in the range of about 150 mm to many tens of meters. In other embodiments, however, smaller or greater lengths are used where the installation requires. Accordingly, as closure 39 is about 50 mm in length, the preferred embodiments make use of a plurality of like closures that, in the closed configuration, collectively and substantially extend across all of opening 15. In those embodiments where the longitudinal length of housing 11 is not an integral multiple of the length of closure 39, one or more of the closures are trimmed to size.

Shutter 41 is resiliently biased into the closed configuration, and progressed into the open configuration as assembly 5 is progressed into aperture 15. As assembly 5 will at any one time engage, at most, two adjacent shutters, the other shutters will remain in the closed configuration and thereby continue to obstruct the ingress of dirt, dust, and other items into housing 11.

Figure 19:
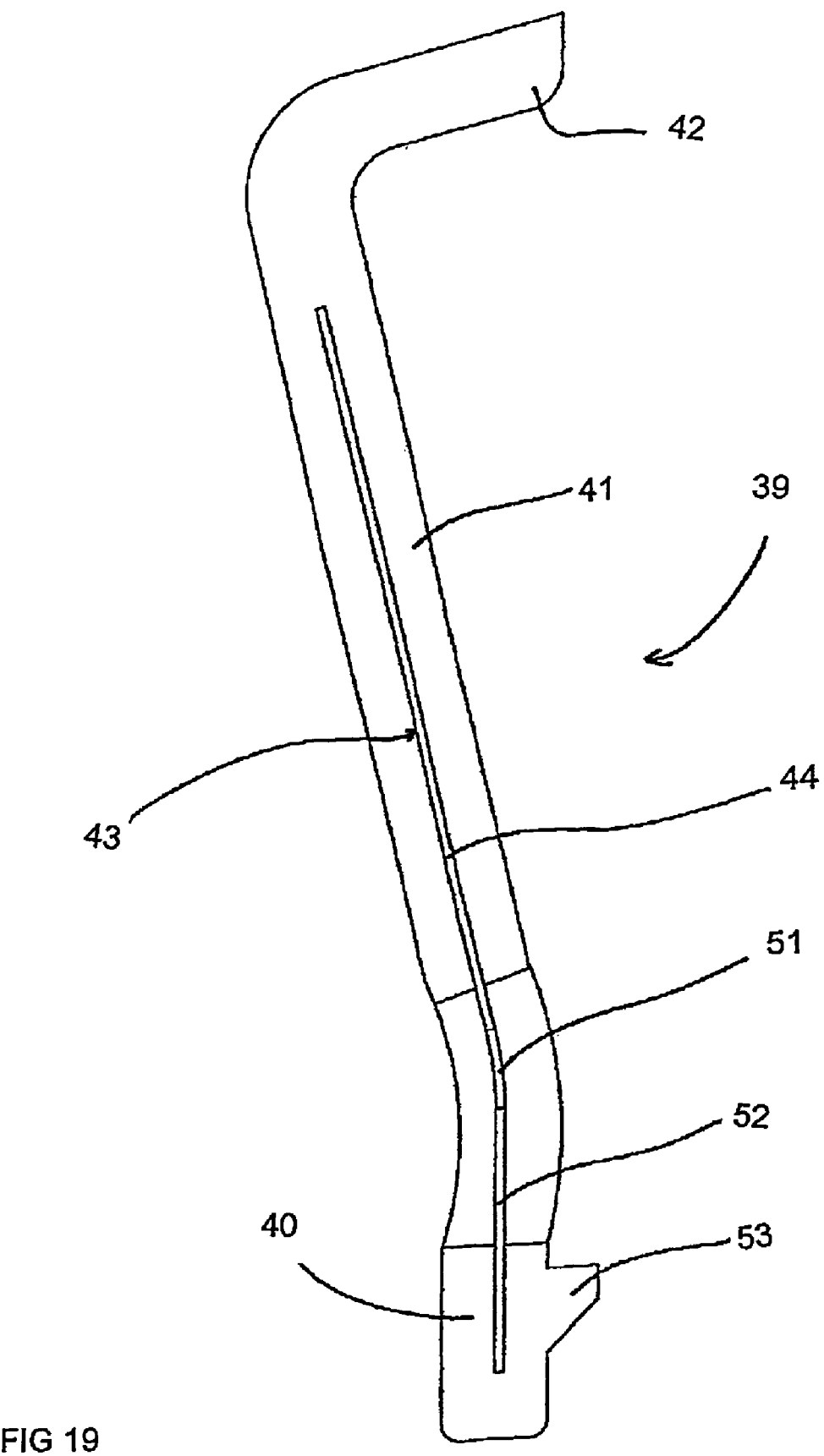
FIG. 19 is an enlarged cross-sectional view of the movable closure.

FIG. 19 shows closure 39 in cross section to illustrate a biasing element, in the form of an internal stainless steel leaf spring 43. The spring is, in this embodiment, disposed entirely within the walls of closure 39 and arranged to bias shutter 41 into the closed position, as shown. The spring comprises an upper part 44 disposed within the main body of the shutter 44, an arcuate centre portion 51 disposed in the main flexing region of the body of closure 39 towards the spigot 40, and a base portion 52 disposed within the spigot end of the closure 39. Spigot 40 has a longitudinally extending flange 53 for engagement with the spaced channel 38 in plate 25.

Figure 20:
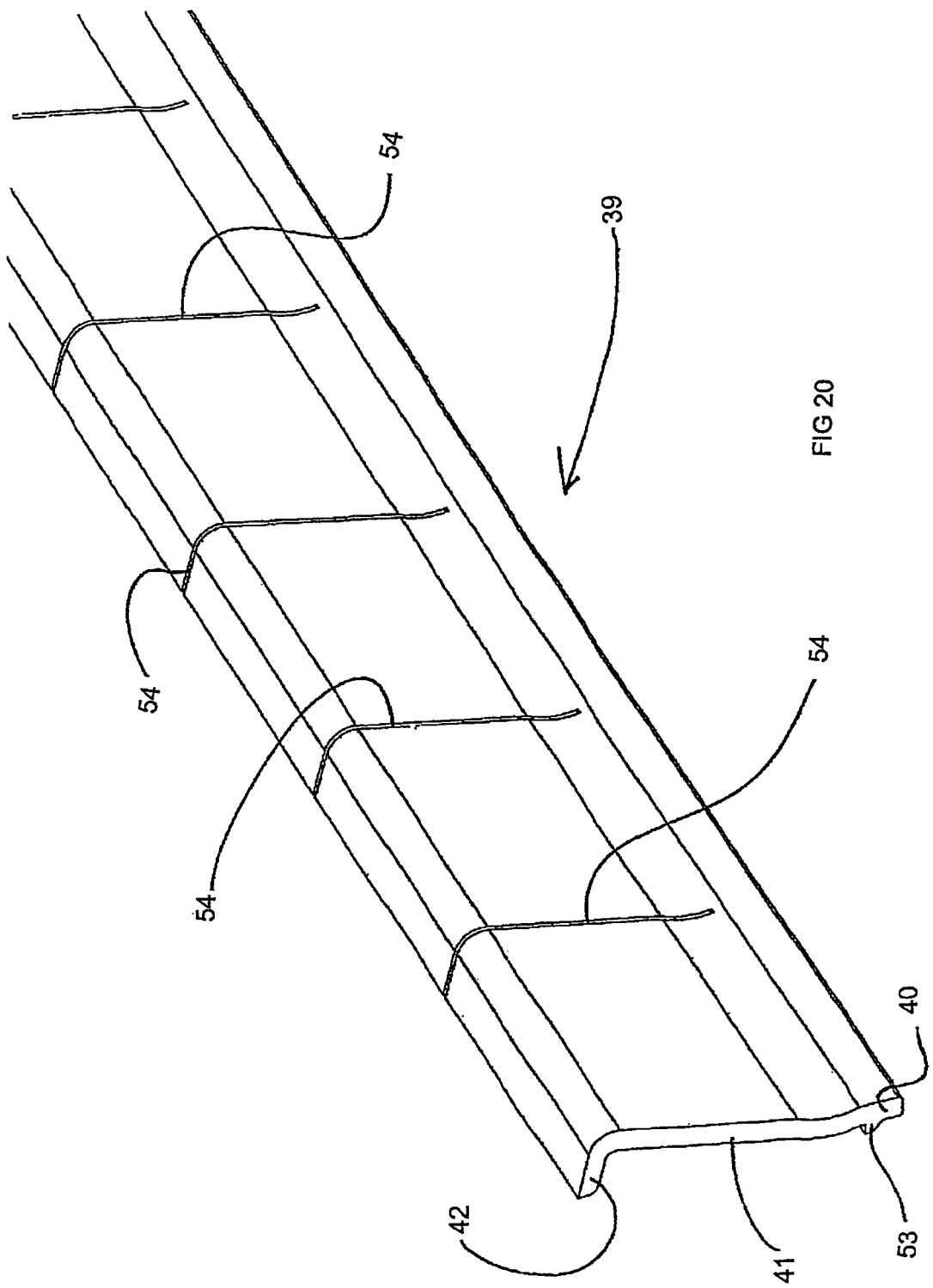
FIG. 20 is a perspective view of the closure of FIG. 19.
Figure 21:
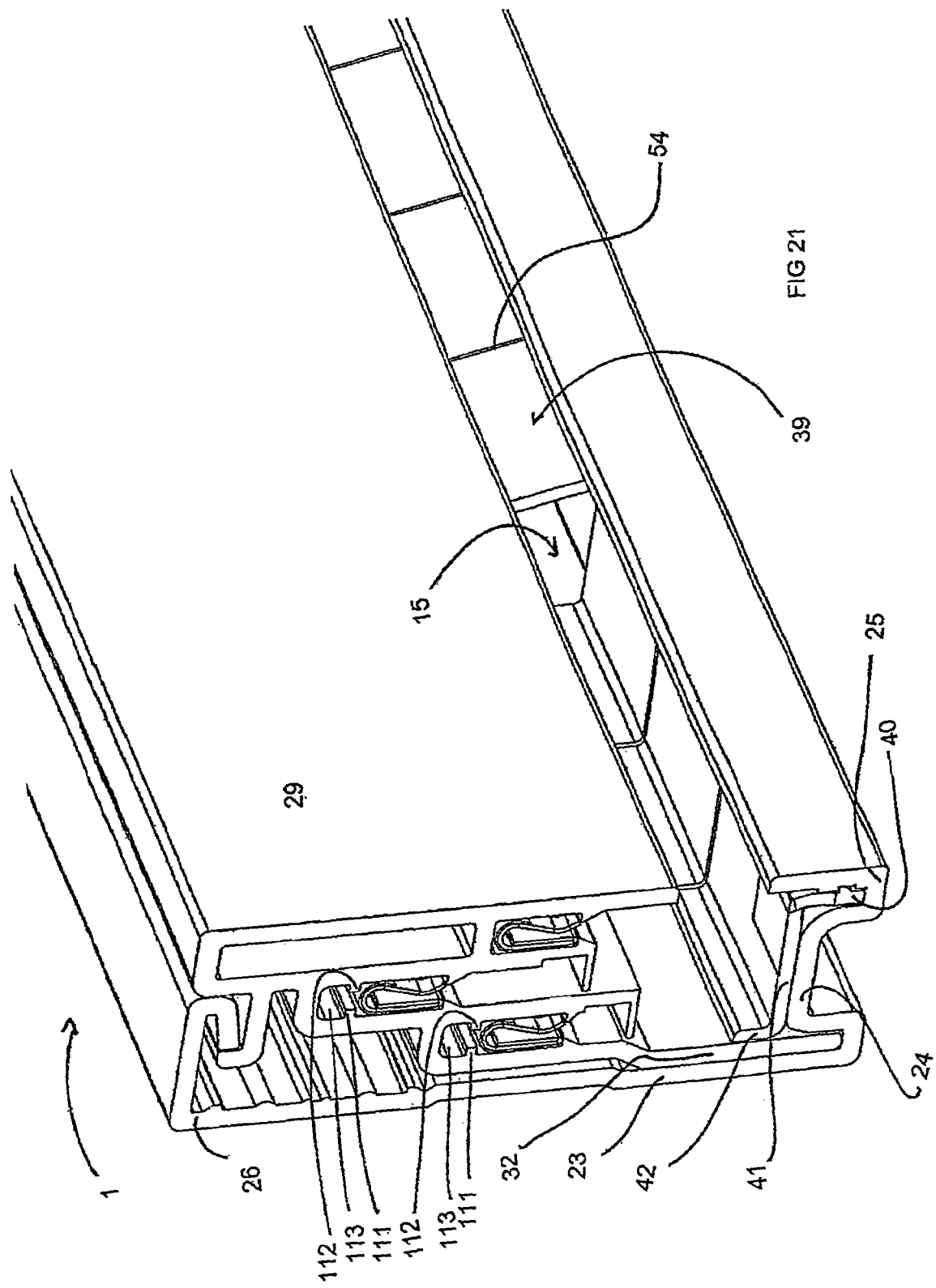
FIG. 21 is a perspective view of the closure of FIG. 19 located in the conduit and showing the closure in the open and closed position.

FIG. 20 is a perspective view of closure 39 best illustrating a plurality of uniformly spaced apart parallel slots 54 that vertical extending through closure 39 from the integrally formed peak 42, through shutter 41 and into the flexing region of closure 39. Slots 54 divide closure 39 into separately movable elements which respond generally independently of each other to the insertion of one or more assemblies 5 into opening 15. This increases the chance of closure 39 remaining in the closed position immediately to the sides of an inserted assembly 5 so as avoid leaving the interior of conduit 1 exposed. The operation of the closure is illustrated in FIG. 21, from which the inserted contact assembly has been omitted for clarity.

The spring 43 is a continuous strip formed longitudinally within the closure 39 with the slots 54 extending through it. In other embodiments, the spring 43 is formed by separate elements with one or more disposed between each slot 54. The spring is made from stainless steel. In other embodiments the spring is made from steel, other metals or plastics. In some embodiments the slots 54 are spaced at intervals of up to 15 mm along the strip, in other embodiments the slots are spaced at intervals of up to 20 mm. In further embodiments the slots are spaced at intervals of up to 50 mm and in still further embodiments the slots are spaced at intervals of over 50 mm. The choice of spacing depends on the width of the contact assemblies used so as to give the best fit of the closure in the opening either side of the assembly.

In some embodiments closure 39 is omitted. In other embodiments, closure 39 is integrally formed with base 24.

It should be noted that the closure has also been omitted from some of the drawings, although this is primarily for the purposes of clarity in illustrating other features of the preferred embodiments.

Housing 11 is formed in a continuous length, and cut to size for the installation being undertaken. Additionally, conductors 2, 3 and 4 are also continuous. If necessary, discontinuous housings and conductors are used, although this is generally less preferred.

The continuous nature of housing 11 and conductors 2, 3 and 4 allow assembly 5 to be received within opening 15, and pins 7, 8 and 9 engaged with respective conductors 2, 3 and 4 at any longitudinal position along housing 11. As will be described below, assembly 5 is therefore able to be positioned, as required. While in some embodiments assembly 5, once positioned, is fixed, in most embodiments assembly 5 is releasably engaged with the conductors and movable, as desired. This provides considerable flexibility in design and placement of assembly 5 and, hence, considerable flexibility in placement of electrical apparatus that connect with assembly 5 to draw power from one or more of the conductors or to transmit and/or receive data via one or more of the conductors.

Assembly 5 includes a generally cylindrical insulating plastic body 45 that coaxially and rotatably supports a circular front face 46. This face has a plurality of apertures arranged in a predetermined orientation corresponding to the standard socket configuration for the jurisdiction concerned. In the illustrated embodiment face 46 includes three apertures in the UK format. Contained within body 45 and behind the apertures are sprung electrical contacts (not shown) for engaging with respective pins of a complementary electrical plug when those pins are received within the apertures. These contacts, in turn, are electrically connected to respective pins 7, 8 and 9. In this embodiment pin 7 is the earth pin, pin 8 is the active pin, and pin 9 is the neutral pin of a single-phase 240 Volt supply system.

Body 45 supports an intermediate annular adjustment band 47 that is mechanically connected to face 46 for allowing manual relative rotation between body 45 and face 46 between a movable configuration, as shown in FIG. 1, to an operative configuration, as shown in FIG. 3. The rotation is about a common axis 48.

Pins 7, 8 and 9 are directly mechanically connected with band 47 via an axle 49 that is coaxial with axis 48. These pins extend radially from the axle and therefore also rotate through a 90° arc as the band is rotated by 90° relative to body 45. In the movable configuration, pins 7, 8 and 9, while located within housing 11, are parallel with and spaced apart from the conductors and, as such, assembly 5 is longitudinally movable along opening 15. In the operable configuration, however, the pins are normal to and engaged with the respective conductors and, as such, assembly 5 is restrained against longitudinally progression along opening 5. To further illustrate, reference is made to FIG. 5, where assembly 5 is in the operable configuration. As shown, pins 7, 8 and 9 extend vertically from axle 49 and are engaged at their free ends with respective conductors.

In other embodiments the pins rotate through other than 90° to progress between the movable and operable configurations. Moreover, in some embodiments, there is a mechanical link including gearing operable between band 47 and axle 49. Typically, the gearing is a reduction gearing to provide mechanical advantage to any manual input. While this necessitates, in some embodiments, the rotation of band 47 through more than 90°, it also allows a greater clamping force between pins 7, 8 and 9 and respective conductors 2, 3 and 4 while containing the manual power required to be exerted. In general terms, the greater the clamping force between the pins and the respective conductors, the better quality the electrical contact and therefore the lower the resistance of the contact. This is particularly important for communication signals, as there contain high frequency components that are more susceptible to degradation due to poor contacts.

Figure 22:
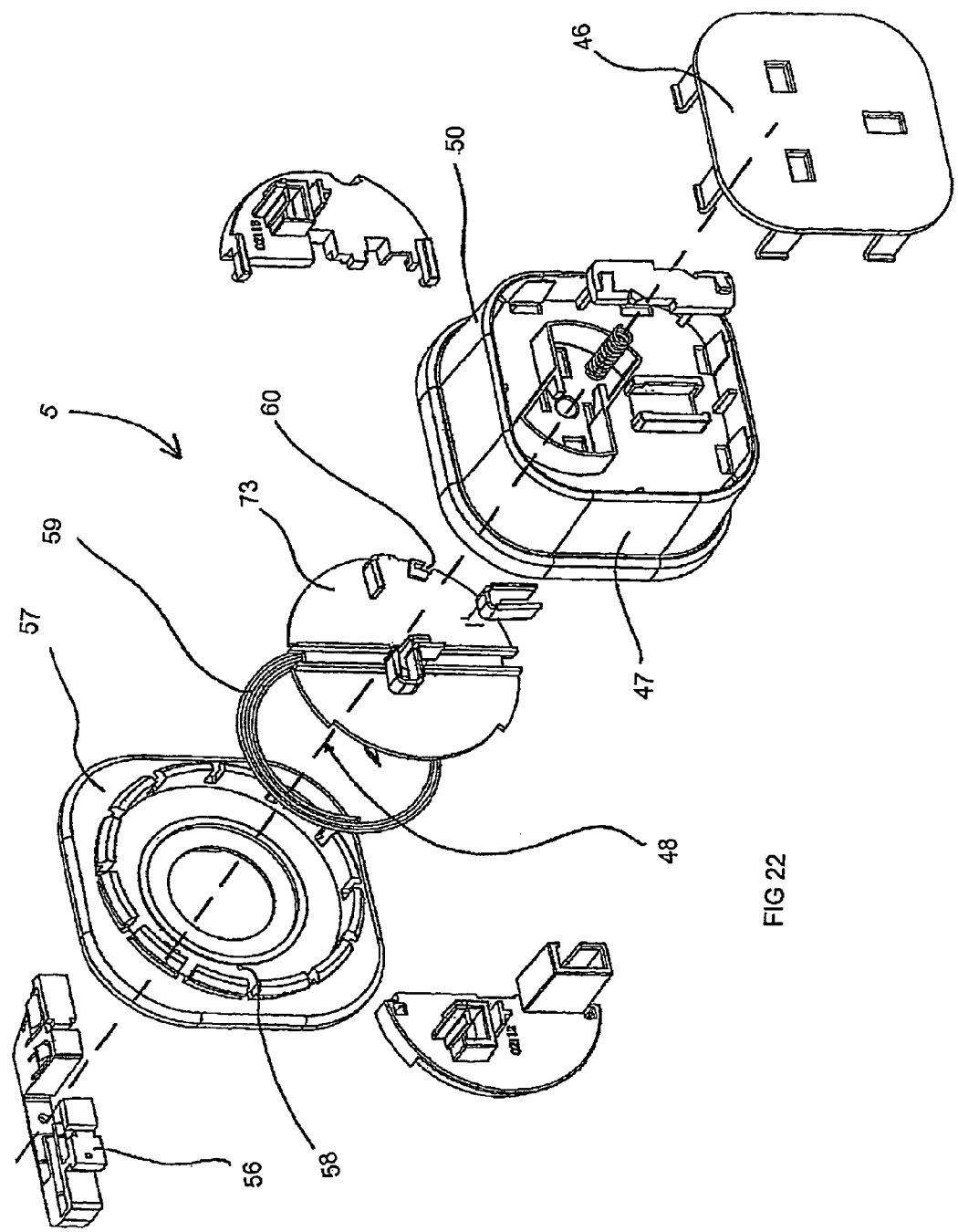
FIG. 22 is a perspective exploded view of the elements of a contact assembly.

In some embodiments the mechanical link between the band 47 and the axle 49 is a spring arranged to bias the pins 7, 8, 9 into the moveable configuration relative to the rest of the assembly 5. FIG. 22 is a perspective view of the contact assembly exploded along the axis 48. The band 47 includes a plate 57 which, when the assembly 5 is assembled is engaged with the band 47 by way of a radially displaced snap locking ridges. The plate 57 is in turn lockingly engaged with an insertion member or pin keeper 56 which provides the bearing for the inner end of the axle 49 and slots into which the pins 7, 8, 9 retract when the assembly 5 is in the moveable position. The keeper 56 serves to protect the pins 7, 8, 9 when they are in this position.

A plate 73 is rotatably disposed within the radial snap lock ridge of the plate 57 and between the plate 57 and the rearward surface of the band 47. In the assembled assembly 5 the plate 73 is engaged for rotation with the axle 49 relative to the keeper 56, plate 57 and band 47. A spiral spring 59 is disposed between the plate 73 and the plate 57 and engaged at one end with a hole 58 in the plate 57 and at the other end with a circumferentially disposed slot 60 in the plate 73. The spring 59 provides biasing between the two plates 57, 73 about the axis 48 and thus biases the pins 7, 8, 9 attached to the axle 49 into the moveable configuration.

Band 47 includes a lever 50 that extends radially outwardly from the band. This lever provides mechanical assistance to a user when manually progressing the band between the operable and movable configurations. In other embodiments, band 47 includes a predetermined arrangement of engagement formations (not shown) for inter-engaging with a complementarily shaped tool.

Figure 23:
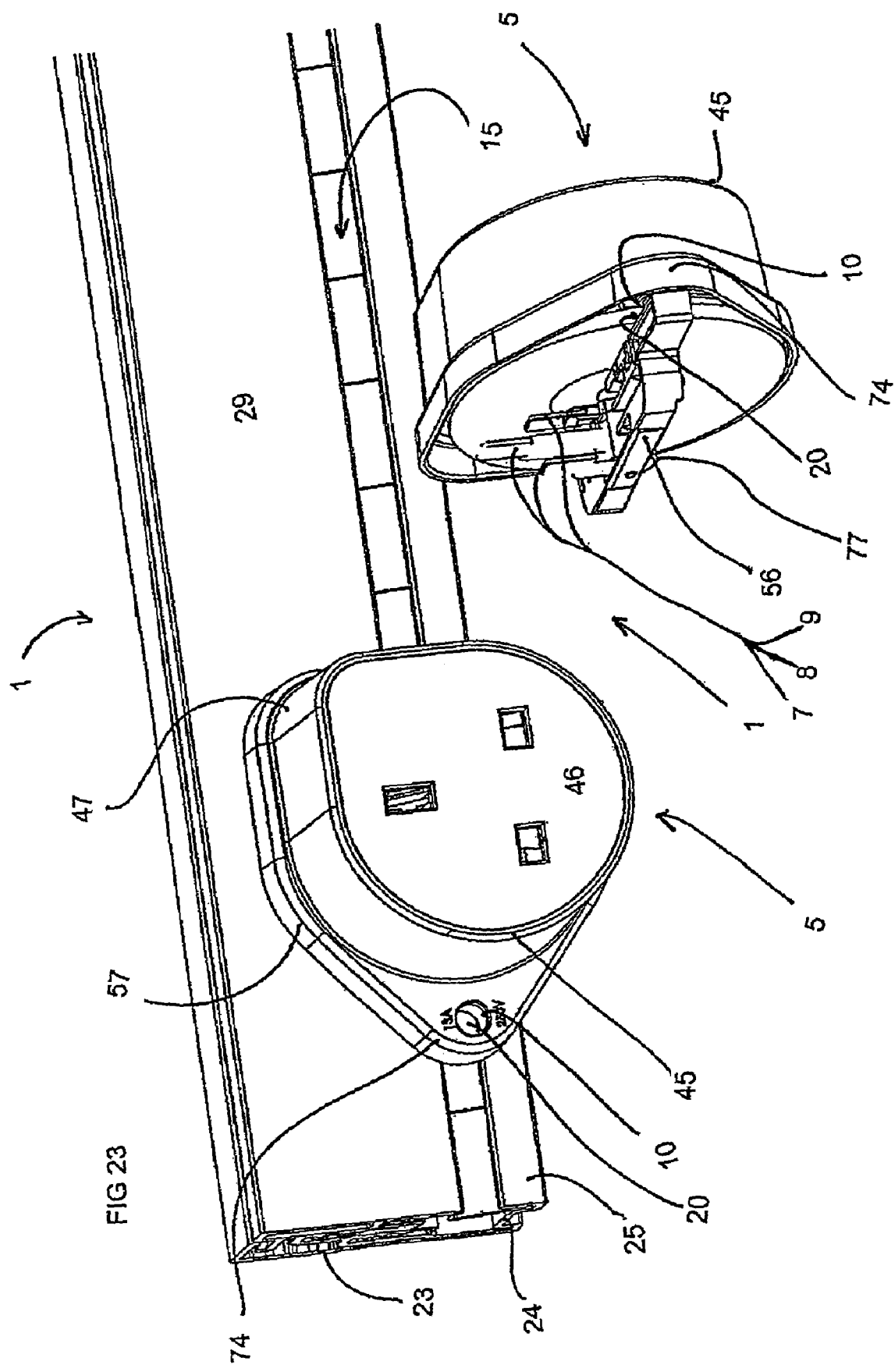
FIG. 23 is a perspective view of a conduit in combination with a contact assembly that is mounted to the conduit in a movable configuration.

In the embodiment shown in FIG. 23 the plate 57 has a radially extending portion 74 that lies over the opening 15 when the assembly 5 is located in the conduit 1 in the engaged position. The portion 74 has an opening 10 extending through the plate towards the forward face 20 of the keeper 56. The forward face 20 is coloured to give a visual indication by its alignment through the hole 58 that the assembly 5 is in the engaged or on position. In other words the face 20 and the hole 58 provide means to indicate that the assembly is in the engaged position. Rotation of the band 47 in the direction to bring the assembly 5 into the moveable or off position moves the hole 58 out of alignment with the face 20 thereby removing the visual indication. This provides the converse indication that the assembly 5 is in the moveable or off position. The face 20 is coloured with paint so as to be more clearly visible though the hole 58. In other embodiments the face 20 is coloured with a sticker or decal or by moulding the keeper 56 from a coloured material. The colour applied or moulded is visually distinctive, luminous and/or fluorescent colour and/or a reflective element.

In use, bracket 21 is cut to the required longitudinal length and attached via screws 22 to an adjacent support surface, typically a wall, floor or ceiling. Bracket 28 is cut to the same length and continuous conductors 2, 3 and 4 are inserted into channels 12, 13 and 14. Post 32 is then placed in channel 27, and bracket 28 rotated so as to bring fittings 26 and 31 into snap-locked engagement and thereby fixedly retain brackets 21 and 28 together.

Assembly 5, with band 47 rotated into the movable configuration, is presented to conduit 1 in the approximate desire longitudinal location on that conduit. Pins 7, 8 and 9 and axle 49 are then progressed through opening 15. As this occurs, axle 49 engages the adjacent shutter 42 and progresses it from the closed configuration to the open configuration. Only the shutter engaged by axle 49 will be progressed to the open configuration, the remaining shutters will remain in the closed configuration.

Assembly 5 is then longitudinally progressed along opening 15 until the final positioning with respect to conduit 1 is determined. If the assembly is progressed longitudinally beyond the initially engaged shutter to a subsequently engaged shutter, the initially engaged shutter automatically returns to the closed configuration, while the subsequently engaged shutter progresses to the open configuration. In this embodiment, the shutters are resiliently biased toward the closed configuration.

Figure 5:
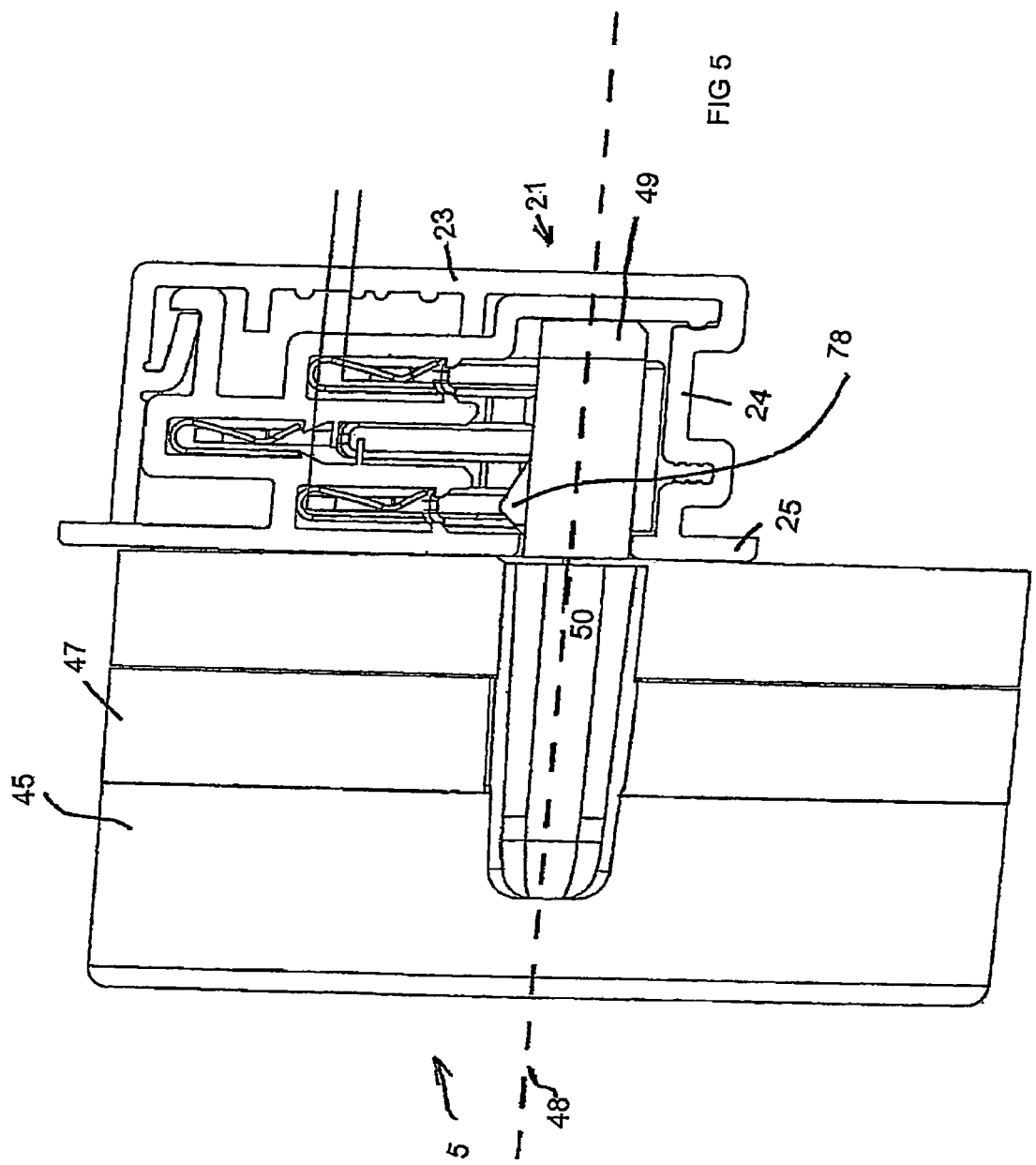
FIG. 5 is a side view of the conduit and contact assembly of FIG. 3.
Figure 7:
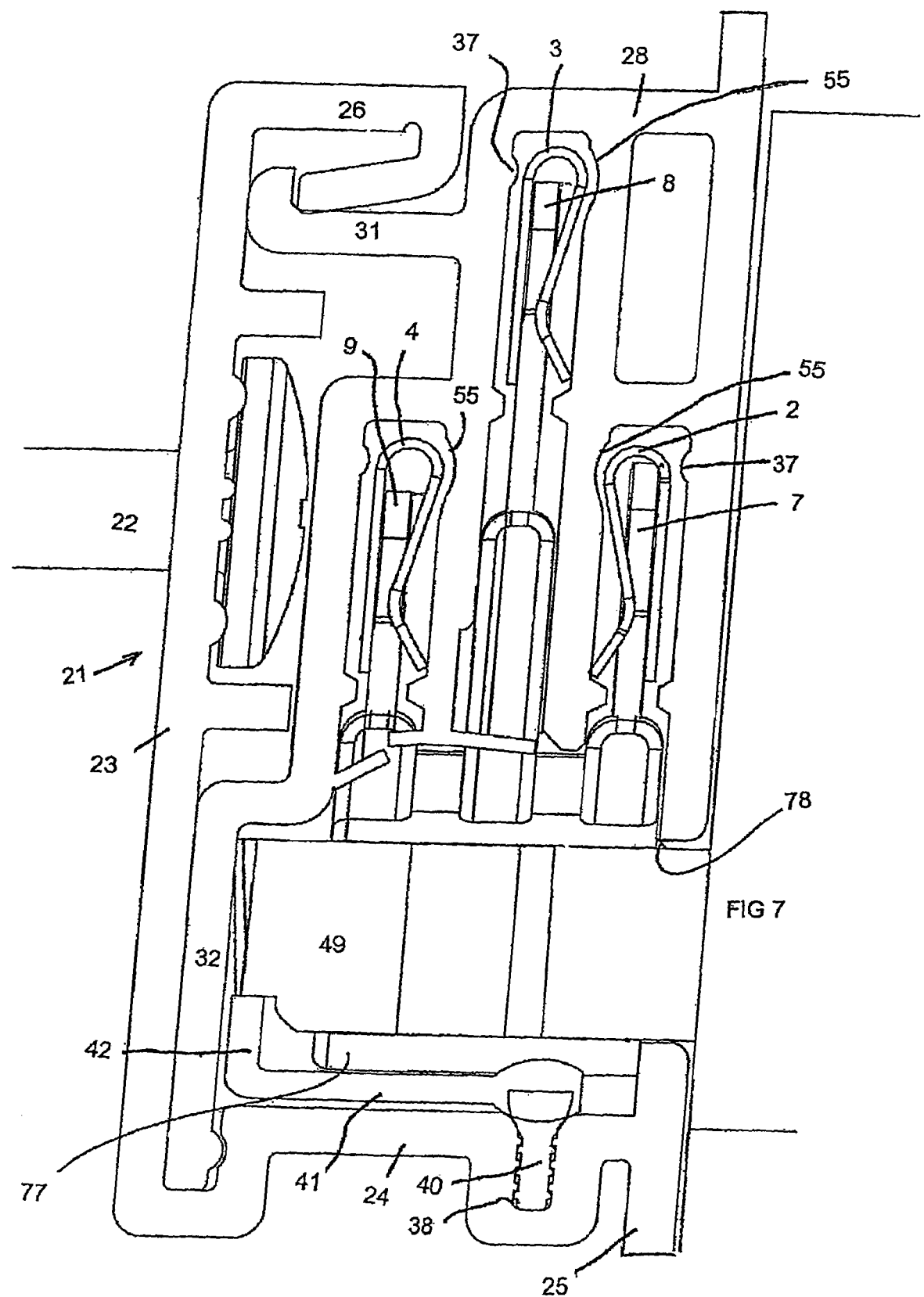
FIG. 7 is a side view similar to FIG. 6 with the conduit and contact assembly in the operative position.

With the location of assembly 5 determined, the user manually rotates band 47 to progress the pins from the movable configuration into the operable configuration of FIGS. 5 and 7. It will be appreciated that closures 17 and 18 are resiliently deformed where they are adjacent to respective pins 8 and 9. Otherwise, those closures remain as a barrier to ingress into channels 12, 13 and 14 of contaminants or unintended items.

Figure 6:
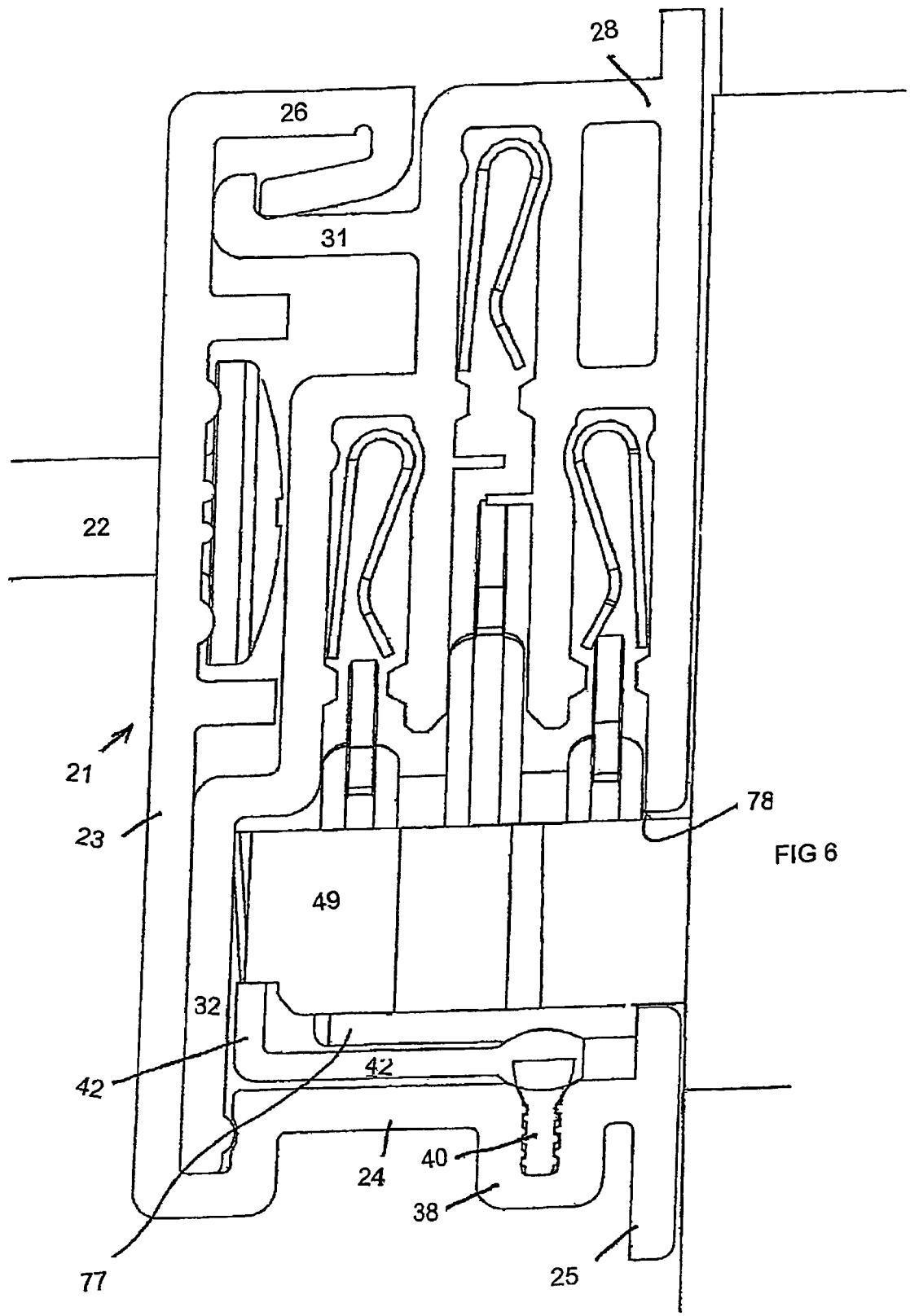
FIG. 6 is an enlarged side view of the conduit and the contact assembly as they are moved relative to each other and from the movable configuration toward the operative configuration.
Figure 24:
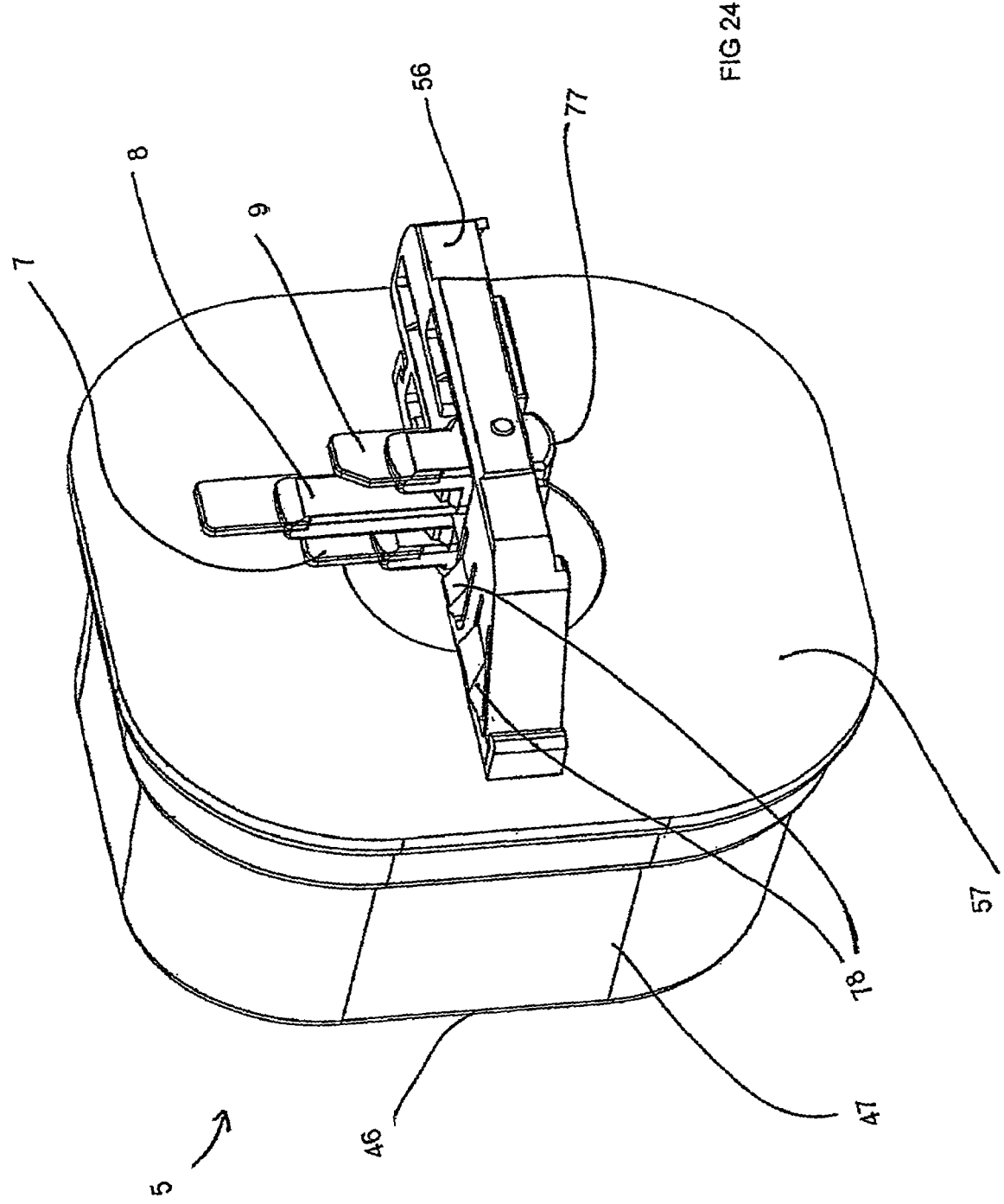
FIG. 24 is a perspective rear view of a contact assembly in the operable configuration.
Figure 25:
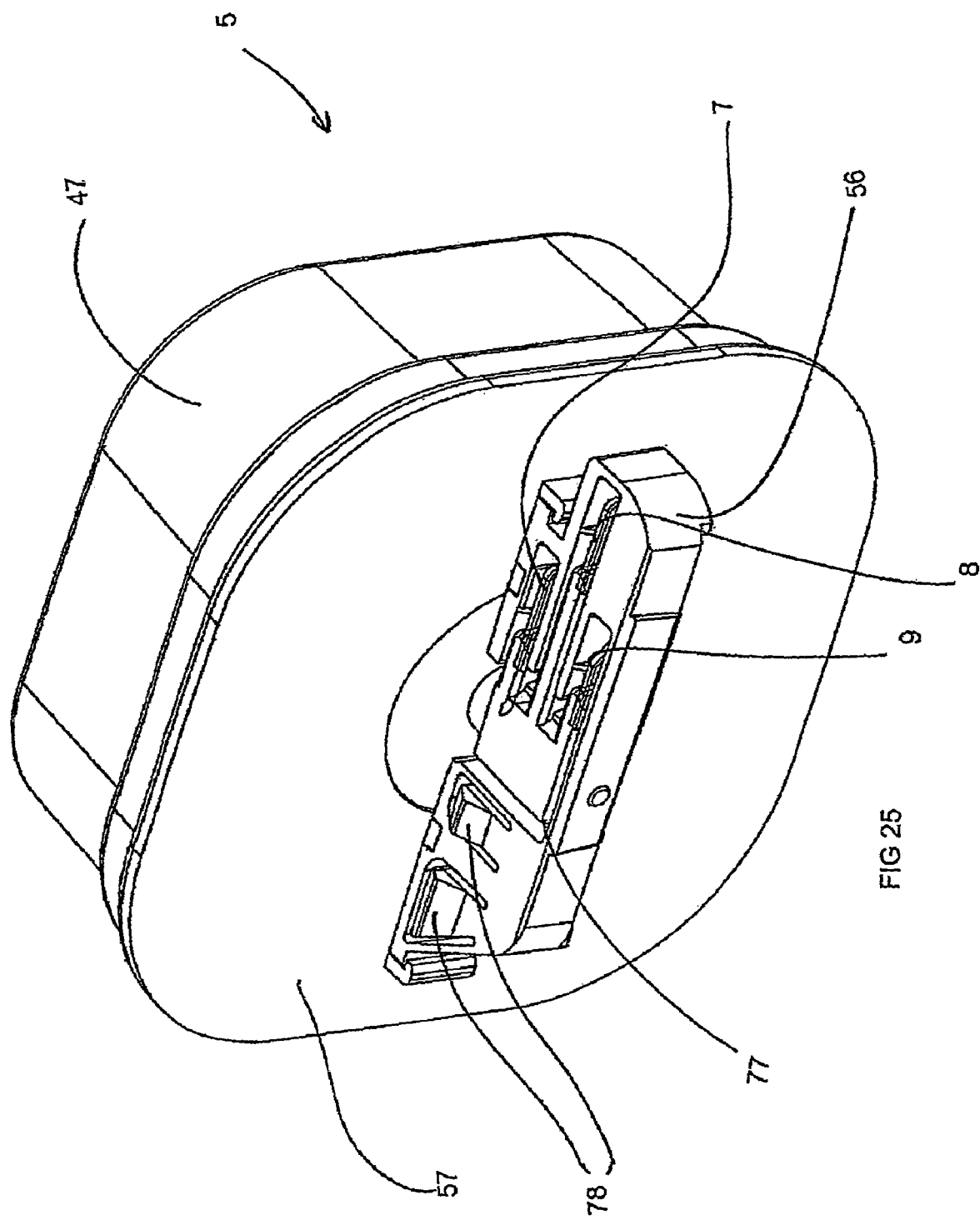
FIG. 25 is a perspective rear view of a contact assembly in the movable configuration.

The surface of the axle 49 forms an axially disposed cam 77 as in FIGS. 6 and 7. The cam 77 is radially spaced to progressively bear against the shutter 41 as the assembly 5 is moved towards the engaged position as in FIG. 7. The cam 77 urges the shutter 41 against the base 24 of the plate 23 and the pins 7, 8, 9 into further engagement with the conductors 2, 3, 4 serving to further secure the assembly 5 into engagement with the conduit 1. In FIG. 24 the assembly 5 in the engaged position but free from the conduit 1 to best illustrate the structure of the cam 77. In FIG. 25 the assembly 5 is in the movable position but free from the conduit 1 and best illustrates the cam 77 retracted within the keeper 56.

The upper surface of the keeper 56 carries two sprung snap fit ridges 78 arranged to engage with the inner edge of the upper lip of the opening 15 when the assembly 5 is inserted though the opening 15 as in FIGS. 6, 7. The structure of the snap fit ridges is further illustrated in FIGS. 24 and 25. The ridges 78 provide a positive indication to the user that the assembly 5 is properly located in the opening 15. The ridges 78 also serve to hold the assembly 5 in the opening 15 when the assembly is in the disengaged or moveable position and facilitate the sliding movement of the assembly to an alternative position along the opening 15. The ridges 78 provide a snap on function and a snap off function for the assembly 5.

Figure 8:
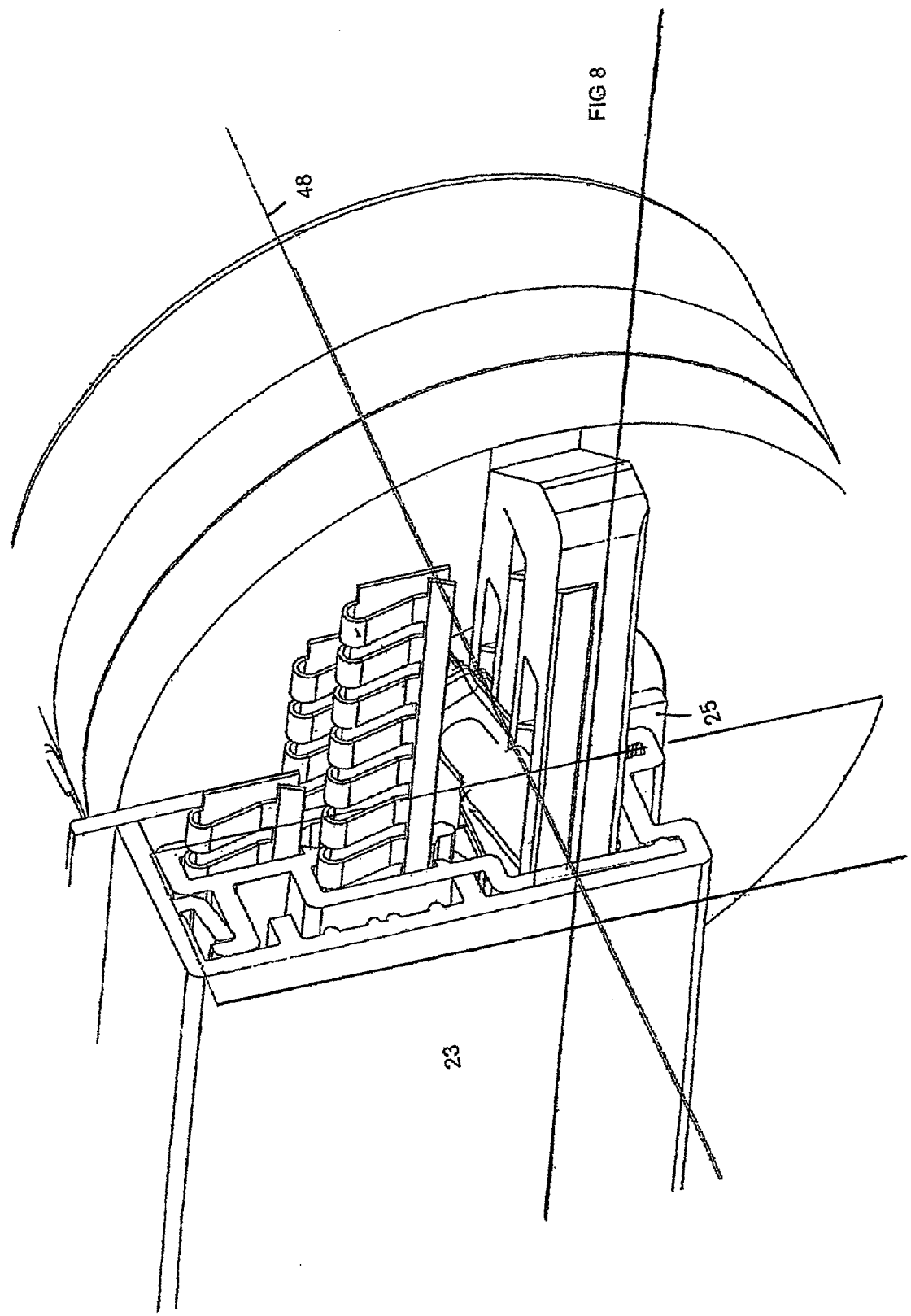
FIG. 8 is a cut-away rear perspective view of the conduit and contact assembly intermediate the operative and movable configurations.

FIGS. 8 and 17 illustrate the pins intermediate the movable and the operative configurations. With particular reference to FIG. 17, it will be understood that as the pins rotate they engage with the respective conductors in a predetermined sequence. In this embodiment, as the pins move from the movable configuration to the operable configuration that sequence includes the first contact being made between pin 7 and conductor 2, and subsequent simultaneous contact being made between pin 8 and conductor 3 and pin 9 and conductor 4 respectively. In other embodiments, pin 9 and conductor 4 are configured to make contact prior to the contact between pin 8 and conductor 3.

It will also be appreciated that, in this embodiment, pin 7 is an earth pin and is always the first pin to contact the respective conductor, and the last pin to be in contact with the respective conductor.

The sequential engagement of the pins with the respective conductors also reduces the maximum manual forces required to rotate band 47.

During movement of the pins from the operable configuration, the breaking of the contacts between the pins and the conductors is the reverse of the predetermined sequence.

It will be appreciated, from the teaching herein, that the predetermined sequence for a given embodiment having co-radial pins of equal thickness is determined by the relative lengths of the pins and the relative offset between the conductors in the direction that the length of the pins is measured. In other embodiments the same effect is achieved by radially offsetting the pins on axis 49, or by having pins of a different radial width.

In practice, conduit 1 supports a plurality of spaced apart like assemblies 5 (not shown) which provide significant design flexibility. Moreover, if, with time, it is desired to longitudinally re-position one or more of assemblies 5, band 47 is progressed to the movable position. Thereafter, assembly 5 is either longitudinally translated along opening 15, or removed from opening 15 altogether and reinserted at the desired location. In any event, once the positioning at the desire location is affected, band 47 is once again returned to the operative configuration and assembly 5 is once again operatively connected with the conductors.

Figure 26:
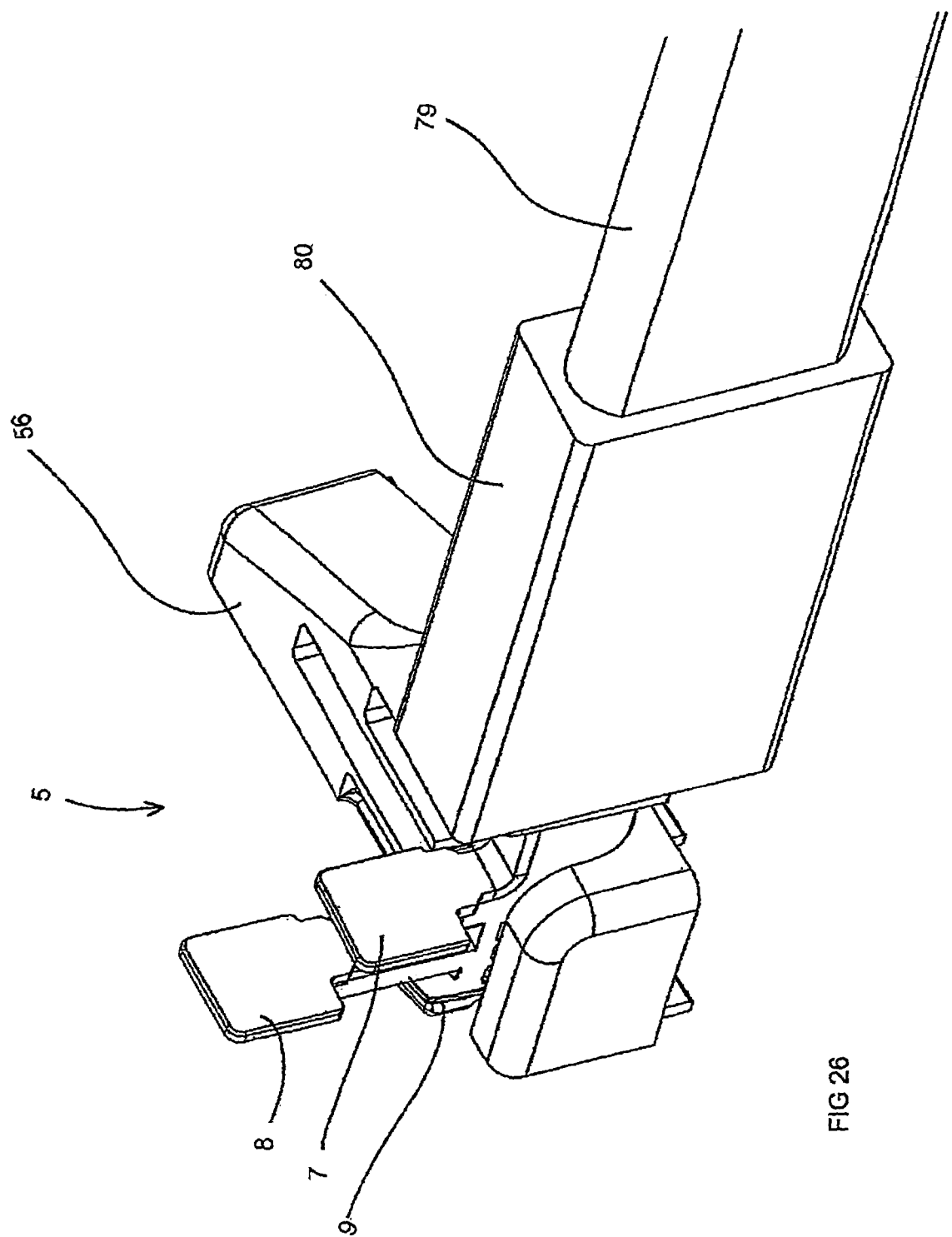
FIG. 26 is a perspective view of an alternative contact assembly.

FIG. 26 is a perspective view of an alternative embodiment of a contact assembly 5. In this embodiment, the socket arranged to accept a plug present in other embodiments is replaced with a cable 79 attached directly to the contacts 7, 8, 9. The connections between the contacts 7, 8, 9 and the cable 79 are sealed inside a moulded plastics body 80 which is rotatably engaged with the keeper 56. The body provides the same functionality as the band 47 of other embodiments, that is, to enable the assembly 5 to be moved between the engaged and moveable positions. The cable 79 is connected at its end distant from the contact assembly 5 (not shown) to a plug. In other embodiments the cable is connected to a socket. In some embodiments the cable is supplied with a pre-moulded plug or socket.

Figure 27:
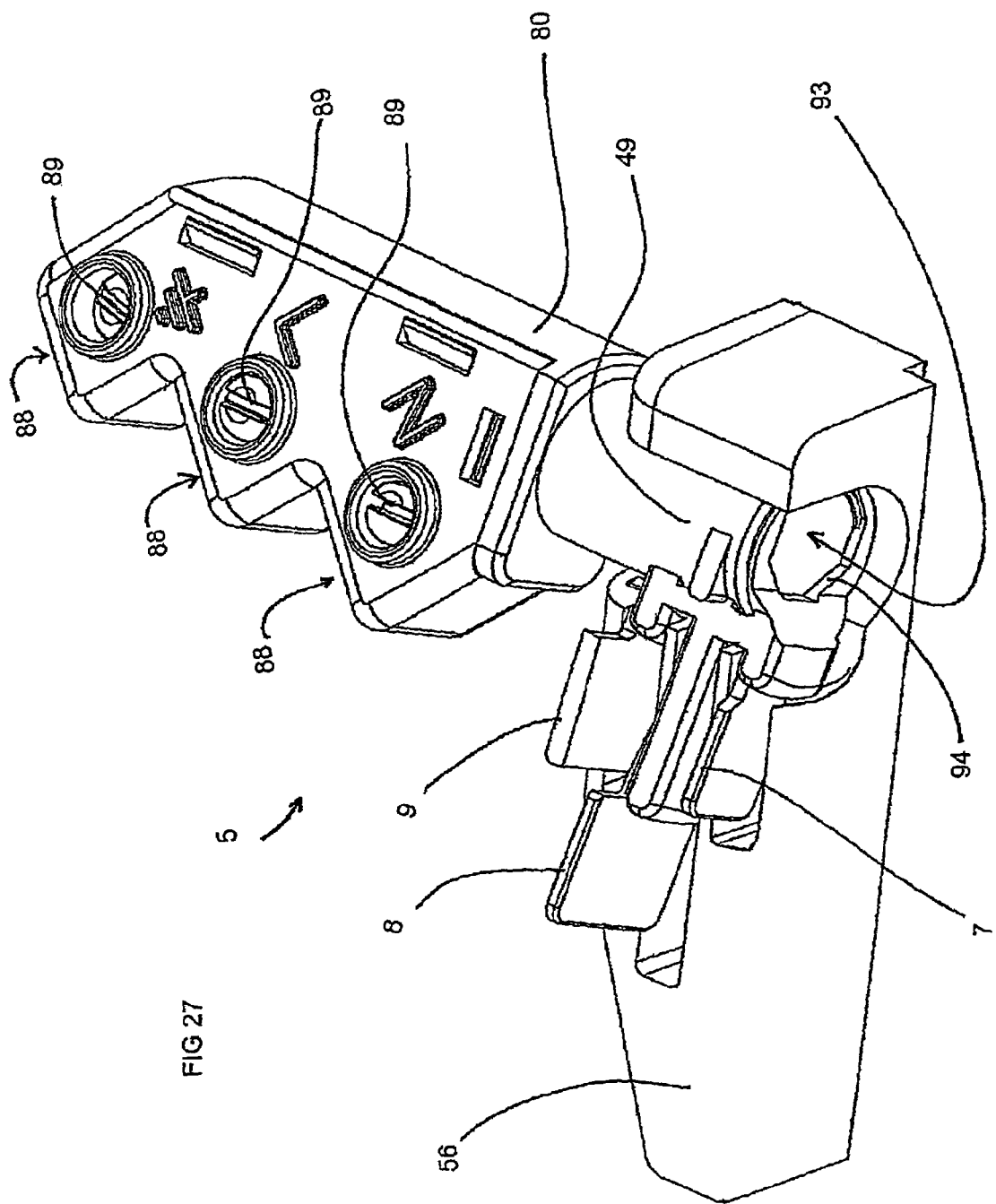
FIG. 27 is a perspective view of another alternative contact assembly.

FIG. 27 is a perspective view of a further embodiment of a contact assembly 5 in which the body 80 is provided with three connectors 88 to which wires can be attached and secured using corresponding grub screws 89. The connectors 88 are in electrical communication with the contacts 7, 8, 9. The assembly 5 is provided with a hexagonal socket 93 defined by an inner wall 94 of the axle 49. The socket 93 is designed to engage with a correspondingly shaped tool (not shown) to provide alternative means for axially rotating the contacts 7, 8, 9 between the engaged and movable positions.

Figure 28:
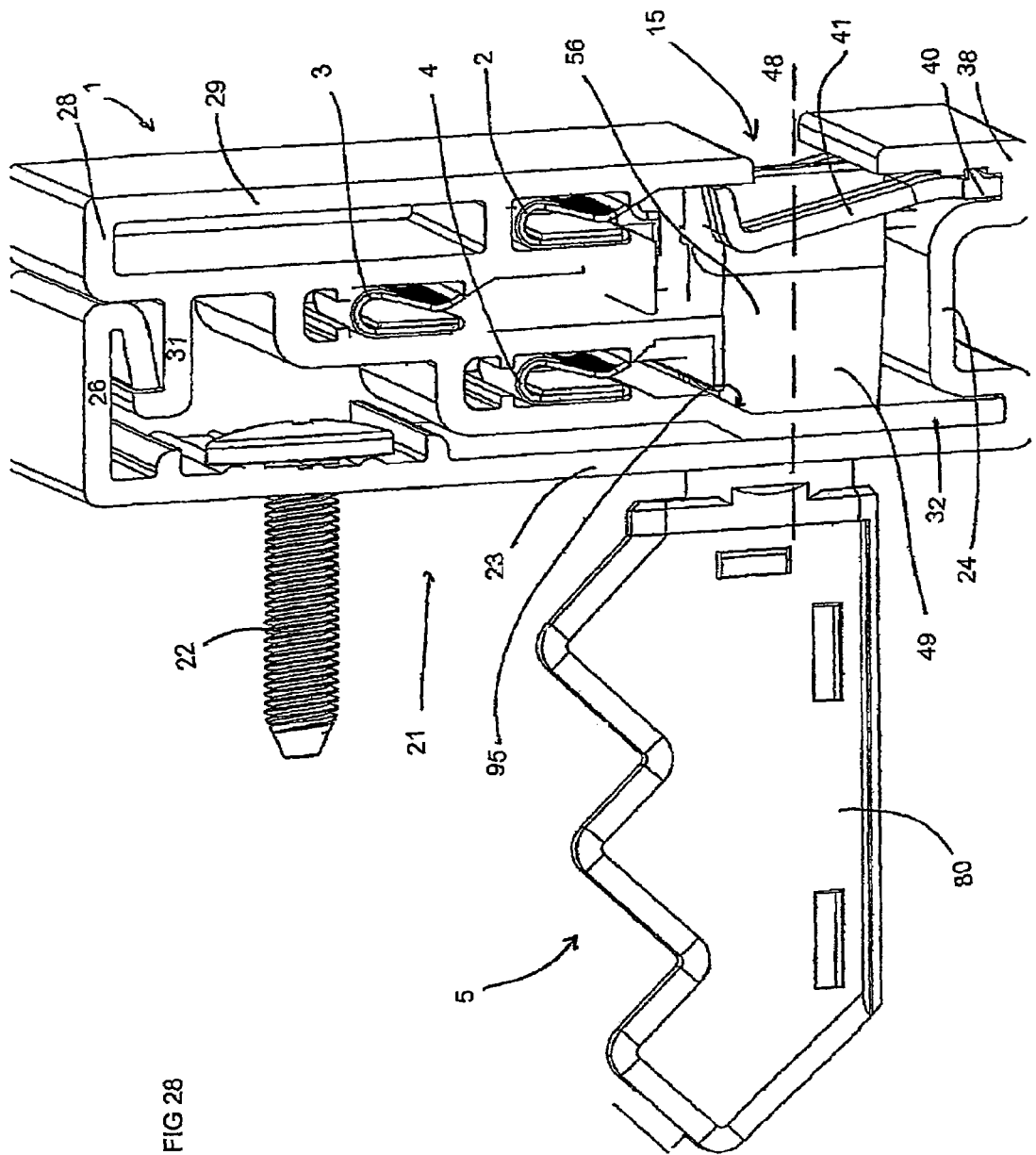
FIG. 28 is a perspective view of the contact assembly of FIG. 27 engaged with the conduit.

FIG. 28 is a cross sectional perspective view of a contact assembly 5 of the type illustrated in FIG. 27 in engagement with a conduit 1. In this embodiment, a hole 95 is formed in the rear plate 23 and the locking post 32 to provide entry for the keeper 56 of the assembly 5 into the conduit 1 from the rear. Once entered thought the hole 95 the assembly 5 is brought into the engaged position either by rotating the body 80 from behind the conduit 1 or by engaging the tool in the socket 93 from the front of the conduit. Since the contact assembly is entered in the opposite direction form those described in other embodiments, the sequence of the pins 7, 8, 9 of the contact assembly 5 used in this embodiment in reverse. This embodiment is particularly suitable for the supply of power or signals to the conductors 2, 3, 4. Where power is being supplied, the contacts 7, 8, 9 provided are more substantial so as to be capable of safely carrying the supply current. The rear entry of the assembly 5 enables the power supply to be concealed behind the conduit 1 while remaining moveable between the engaged and disengaged positions from the front of the conduit 1.

Figure 29:
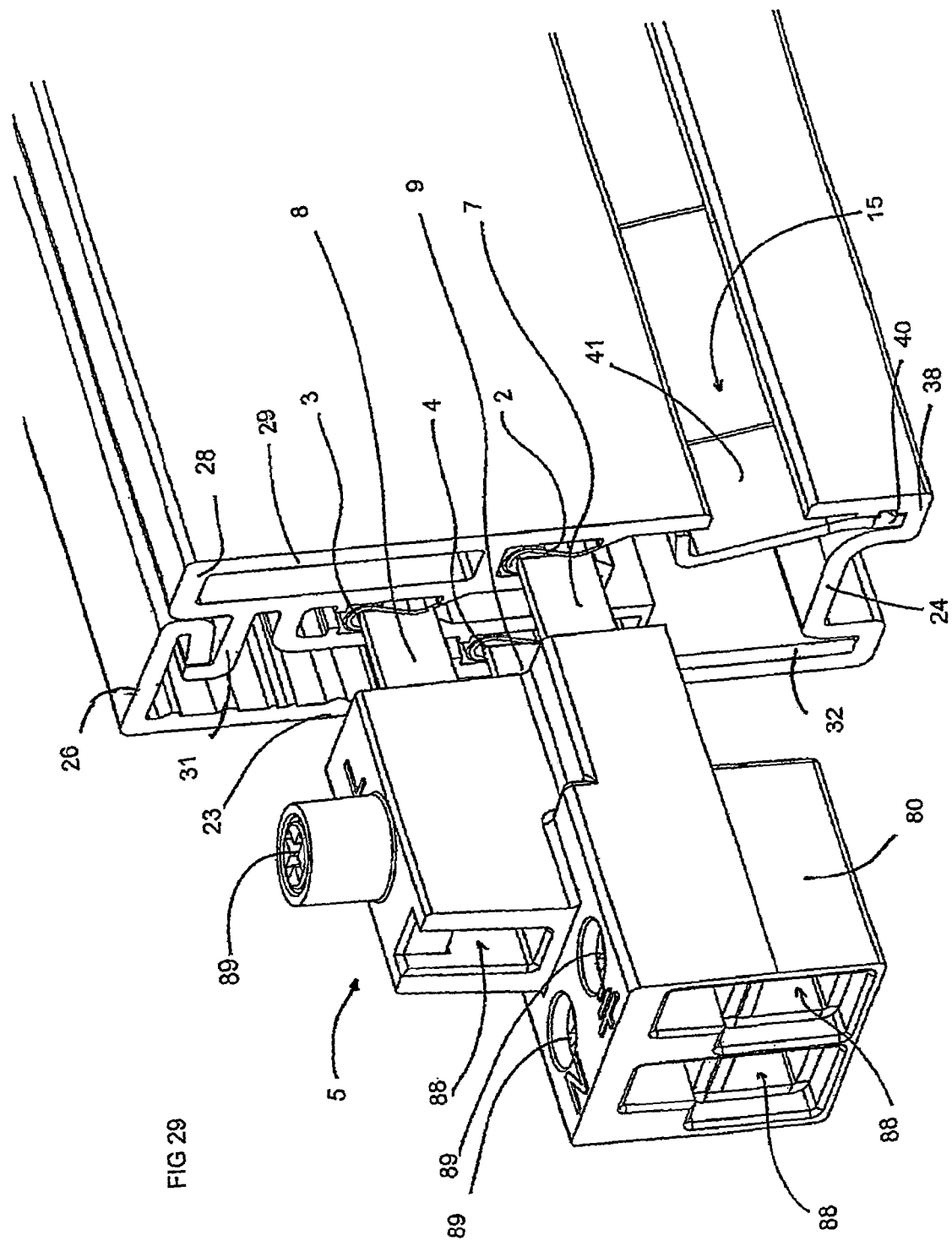
FIG. 29 is a perspective view of a further alternative contact assembly engaged with the conduit.

FIG. 29 is a perspective view of an alternative assembly 5 in engagement with the end of the conduit 1. The assembly 5 comprises a moulded body carrying pins 7, 8, 9 protruding at one end in a spaced arrangement corresponding to that of the elongate conductors 2, 3, 4. The pins 7, 8, 9 are arranged for entry into the open ends of conductors 2, 3, 4 in a plane parallel to the rear plate 23 of the conduit 1. The body 80 provides connectors 88 and screws 89 for attaching appropriate wires to the ends of the pins 7, 8, 9 distant from the entry into the conductors. The pins 7, 8, 9 of the assembly 5 are brought into and out of engagement with the conductors 2, 3, 4 by pushing or pulling the assembly respectively along the plane of the conductors parallel to the rear plate 23 of the conduit. The assembly 5 of this embodiment is suitable for connecting supply power or signals to the conductors 2, 3, 4. The pins 7, 8, 9 and corresponding connectors 88 are each stamped from one piece of copper alloy sheet. This provides for simple construction and good signal conduction properties as noted above.

Figure 30:
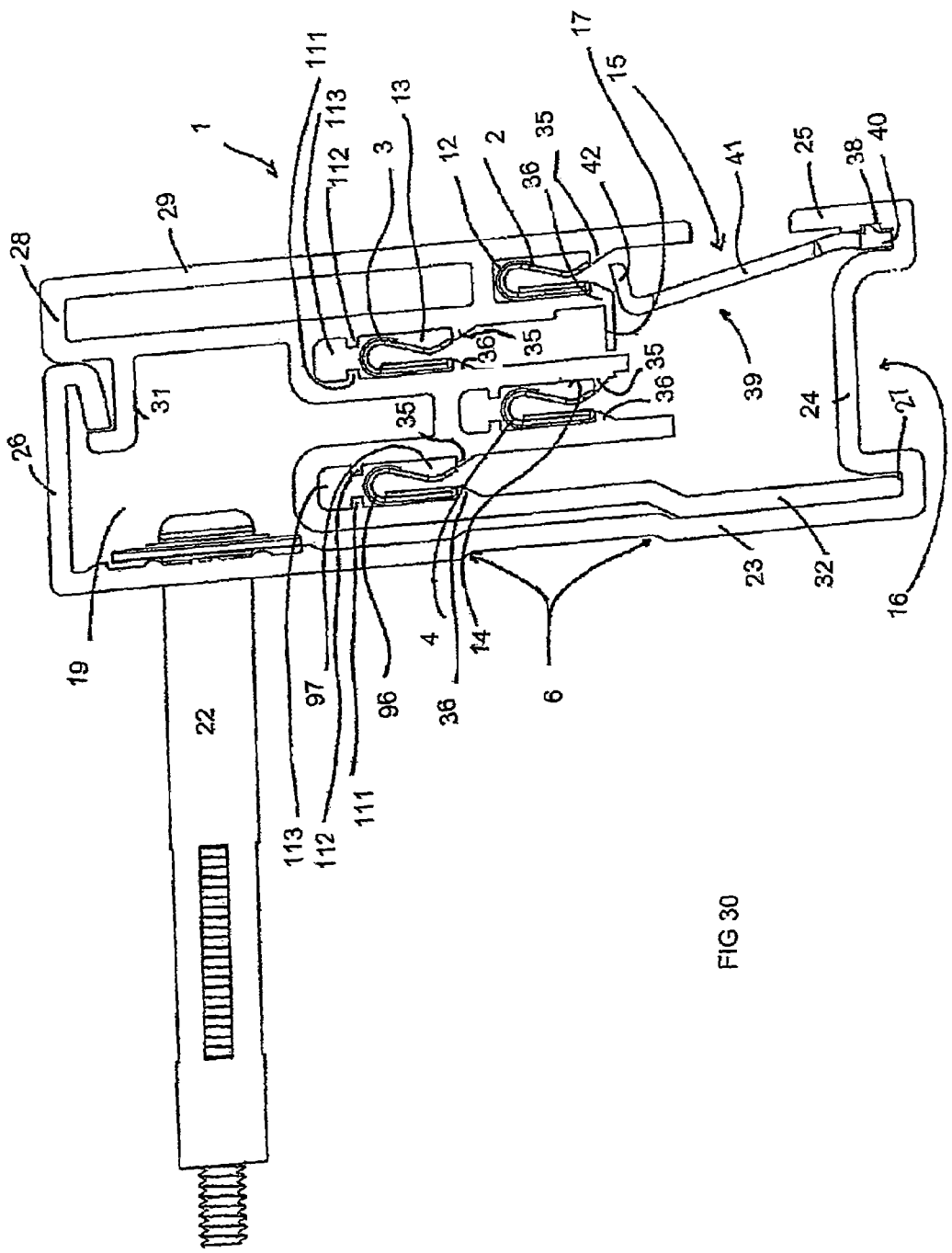
FIG. 30 is a cross sectional side view of and alternative conduit arrangement.

FIG. 30 is a cross sectional view of an alternative embodiment in which the conduit 1 carries a fourth elongate electrical conductor in addition to the three conductors 3, 4, 5 described in other embodiments. The additional conductor 96 is disposed in an open ended channel 97 formed behind the other channels 12, 13, 14, towards the rear of the plate 29. The channel 97 runs parallel to the other three channels and is spaced at the same distance from the base 24 as the upper most of the other channels 13.

The four conductor conduit 1 described above is suitable for carrying two electrical circuits in one installation. In one embodiment the two circuits are of different power ratings in another embodiment one circuit is regulated and the other unregulated. Alternatively, the conduit supplies two different communications circuits or, instead, one power and one communications circuit. In other embodiments the two circuits are used to provide a dual voltage power system. In further embodiments the circuits provide one power circuit and an extra control conductor.

In the dual voltage (two phase) supply embodiment, the conductor 2 nearest the front plate 29 provides the earth connection, the next nearest conductor 3 provides the live connection for the first phase, the next conductor 4 provides the neutral connection and the rearmost conductor 96 provides the live connection for the second phase.

Assemblies for use with the four track conduit 1 are adapted so that the appropriate pins engage with the corresponding conductors. In the two phase power supply embodiment described above, a first type of contact assembly with a standard socket layout is arranged to engage with the conductors 2, 3, 4 supplying the first phase voltage. A second type of assembly with a modified socket layout is arranged to engage with conductors 2, 4, 96 supplying the second phase voltage. The pins of the two types of assembly are arranged so that neither can be engaged with the incorrect voltage. Where the assemblies include a plug socket, there are different socket arrangements for the different voltages.

The open ended channels 13, 14, 96 illustrated in FIG. 30 include the longitudinally extending ridges 35, 36 to hold the conductors 3, 4, 96 in the channels. The channels also include a second set of longitudinally extending ridges 111, 112 which restrain the upward freedom of the conductors in the channels and define airspaces 113 above each of the conductors. These air spaces 113 provide ventilation to dissipate heat generated by the conductors. In the embodiment shown in FIG. 30, the earth conductor 2 is not ventilated in this manner as it generates little heat in normal operation. Airspaces 113 are also illustrated in the three conductor arrangements of FIGS. 18 and 21. In some embodiments, all conductors are provided with such airspaces.

That is, as the power and communication requirement of a building, or room within that building, change, conduit 1 allows the location of the power and communication outlets to be quickly and easily modified to accommodate any change in the required functionality.

Figure 11:
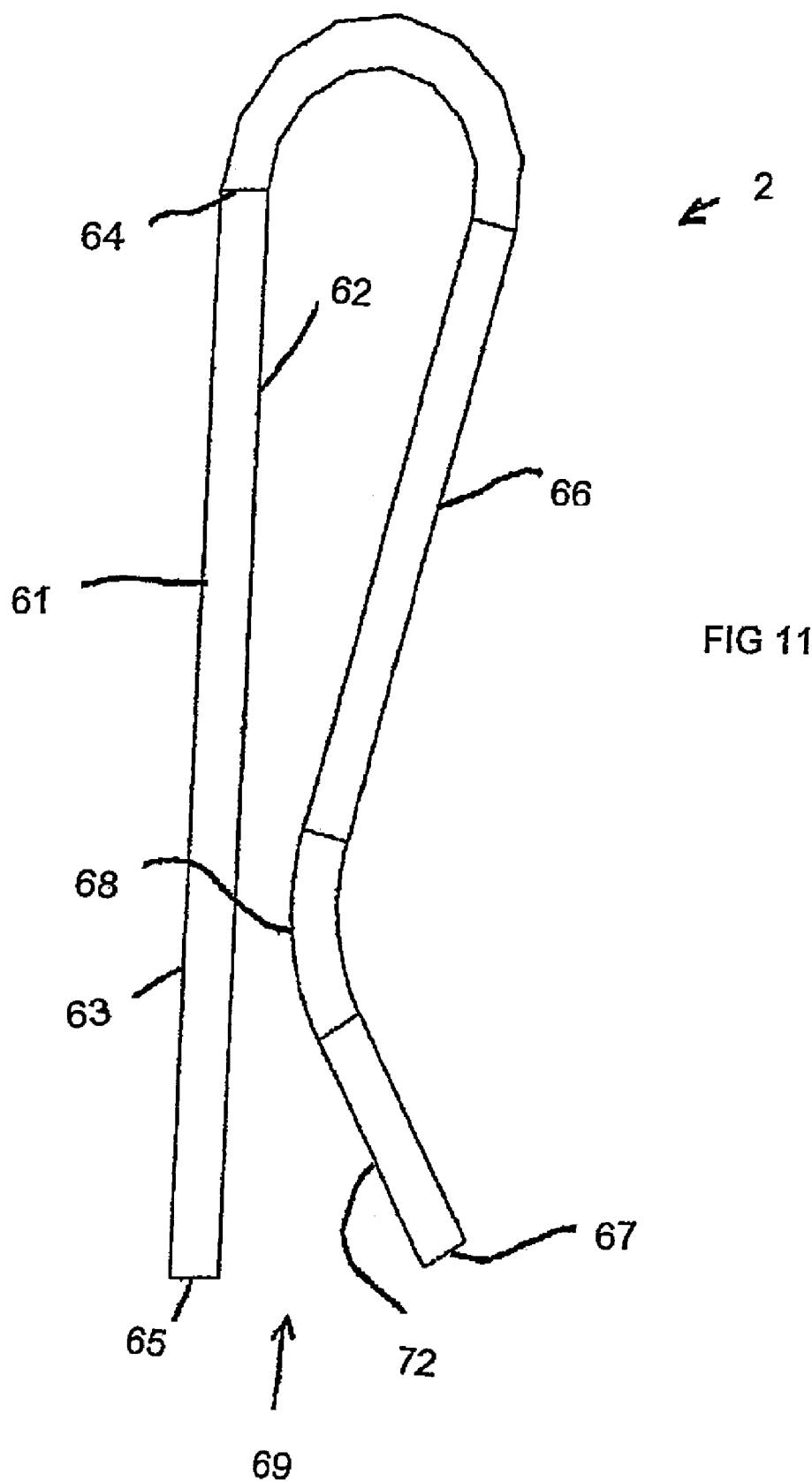
FIG. 11 is a side view of a conductor according to the invention.
Figure 12:
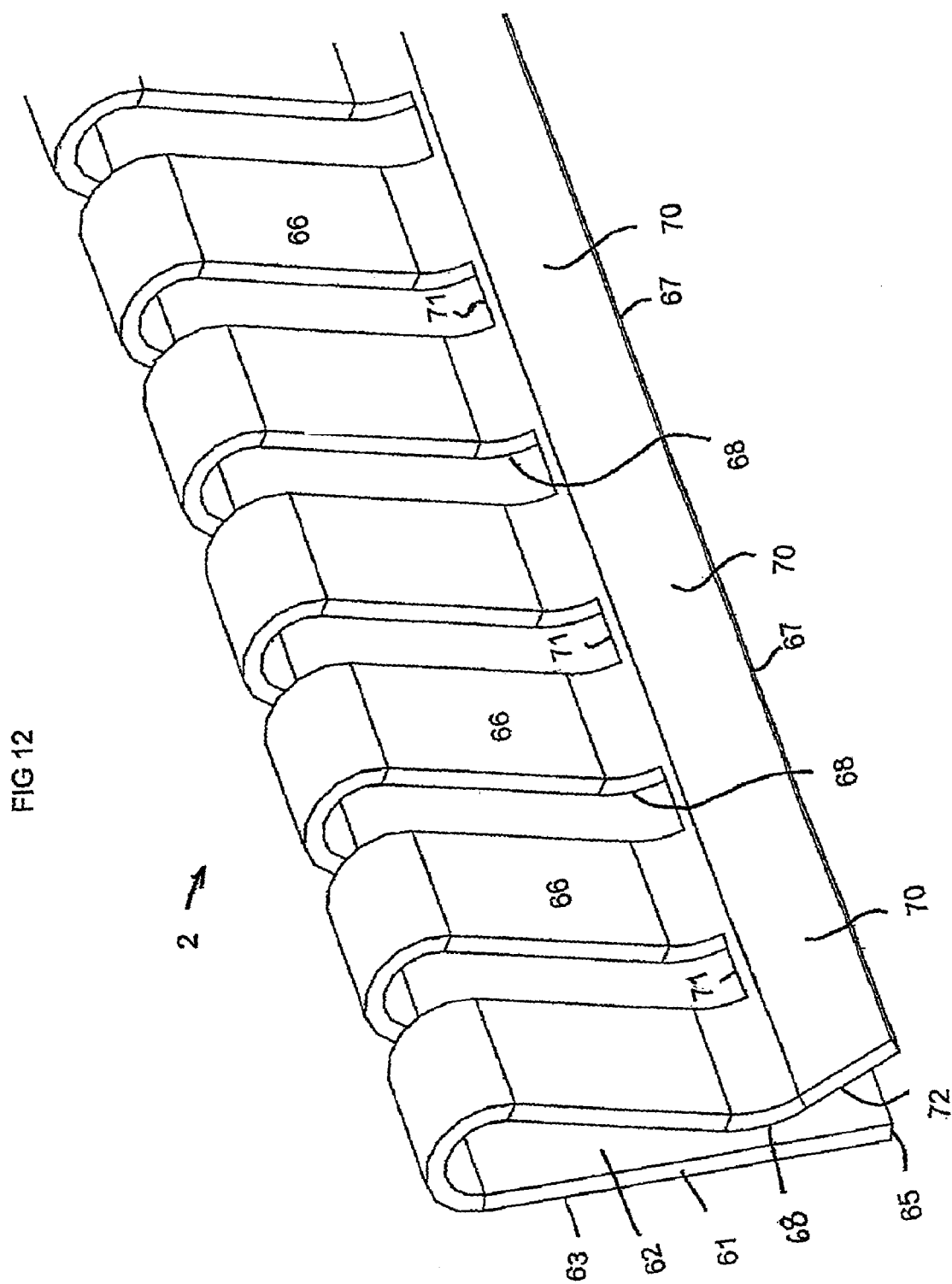
FIG. 12 is a perspective view of the conductor of FIG. 11.

Reference is now made to FIGS. 11 and 12, which specifically illustrate conductor 2. It will be appreciated that conductors 3 and 4 are of the same construction and offer the same functionality as conductor 2 and, as such, will not be described separately. As discussed above, conductor 2 is longitudinally elongate and is adapted for electrically connecting with an electrical contact in the form of pin 7. Conductor 2 includes a longitudinally extending elongate metal conductive body in the form of a copper sheet 61 for defining a first substantially planar contact surface 62 and an opposite face 63 that meet at common parallel longitudinal edges 64 and 65. A plurality of longitudinally spaced apart resiliently deformable ribs 66 extend from sheet 61 to respective free ends 67 that are spaced apart from the surface 62 for allowing pin 7 to be progressed between sheet 61 and one or more of ribs 66. Each rib includes a respective arcuate contact surface 68 that is opposed with surface 62 wherein, upon progression of pin 7 between sheet 61 and the one or more ribs 66, surface 62 and the respective one or more surfaces 68 are resiliently biased into engagement with the pin.

In the configuration shown in FIG. 11, the spacing between ends 67 and surface 61 is greater than the spacing between surfaces 62 and 68.

All of ribs 63 extend from edge 64 to allow edge 65 and ends 67 to collectively define an opening 69 for receiving pin 7.

Ribs 66 extend transversely away from edge 64 and back along substantially all of surface 62. The ribs do not extend at all along face 63 and, hence, minimise the required transverse thickness of conductor 2.

Adjacent ends 67 are mechanically and electrically connected to collectively increase the resilient bias between surfaces 62 and 68 when engaged with pin 7. In this embodiment, adjacent ends 67 are mechanically connected by respective intermediate integrally formed segments 70. These segments have respective top edges 71, and bottom edges that extend between and which lie flush with ends 67. Segments 70 collectively define with ends 67 an engagement face 72 for guiding the progression of pin 7 into biased engagement with surfaces 62 and 68. In this embodiment, face 72 is substantially planar, continuous and opposed with and inclined with respect to surface 62. In other embodiments, face 72 is arcuate.

Segments 70 allow conductor 2 to have a higher clamping force upon pin 7 as the clamping bias is provided not only by those ribs that are in direct contact with the pin, but also the adjacent ribs. Moreover, with pin 7 in the operative position, it will be in direct contact with surface 68 of one or two of the ribs. The immediately adjacent ribs, however, will bias the edges 71 into abutment with the longitudinal edges of pin 7, and thereby further retain that pin in the operative position. That is, conductor 2 offers both clamping and a mechanical locking of pin 7 in the operative position. This effect is best shown in FIG. 7.

It will be appreciated that in other embodiments surfaces 68 include a compound arc.

Sheet 61 is the primary current carrying component of conductor 2. While some current inevitably flows along a path defined by ends 67 and segments 70, this is typically less than that flowing through sheet 61. The primary function of ribs 66 and intermediate segments 70 is to provide clamping and locking engagement with pin 7 and to otherwise ensure it is secured in good electrical contact with sheet 61.

Sheet 61 extends substantially along a plane and surface 62 is substantially planar to provide a large contact area between surface 62 and the adjacent opposed planar surface of pin 7. It will be appreciated that this area is far greater than the contact area between surface 68 and the adjacent surface of pin 7. This asymmetry also allows the transverse width of conductor 2 to be minimised. Moreover, less regard need be had to the current capacity of ribs 66—in that the dimensions of the ribs is not critical—as less reliance is placed upon this current path. Rather, the highly conductive, continuous and regularly shaped sheet 61 offers a high quality low resistance current path, while ribs 66 are intended more for optimising the electrical engagement of the pin with surface 62.

Conductors 2, 3 and 4 are continuous to provide as low a resistance path as possible. This is also important for higher frequency signals, as discontinuities such as joints can provide sites for signal reflections and thereby compromise the data being communicated. Typically, the conductors are longer than conduit 1, and extend between adjacent like conduits. For example, reference is made to FIG. 15 where two conduits 1 are mounted to respective support surfaces (not shown) and extend normally away from each other. Conductors 2, 3 and 4 extend continuously through and between both conduits 1. Moreover, the conductors accommodate bending or folding about a vertical axis (or axes). While the uniform bend in each conductor shown in FIG. 15 extends through a total of 90°, in other embodiments alternative bends are accommodated.

Figure 15:
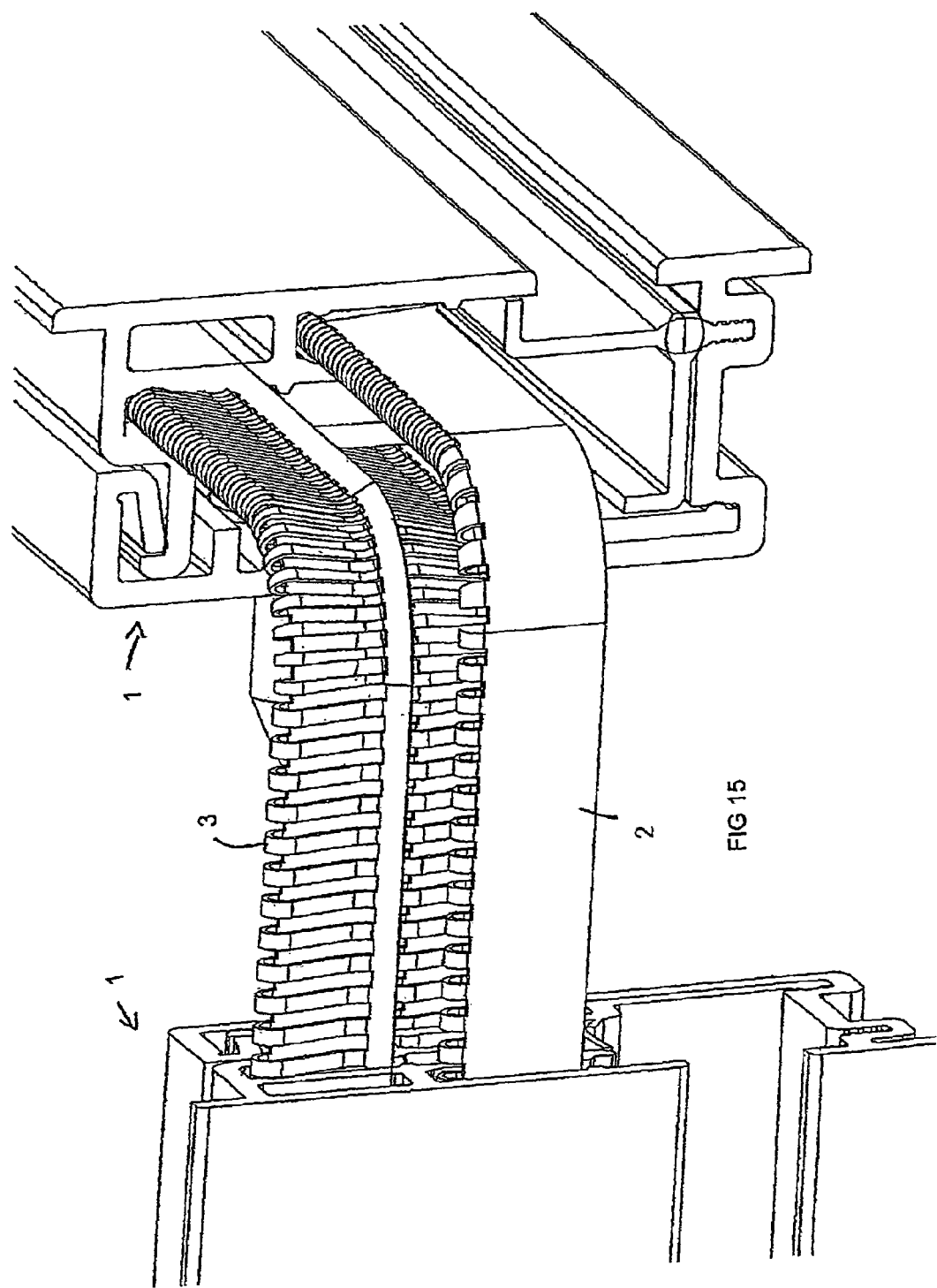
FIG. 15 is a perspective view of the conductor of FIG. 11 extending between two conduits of FIG. 1.

It will also be appreciated that conductors 2, 3 and 4 are able to longitudinally slide in respective channels 12, 13 and 14. This is particularly important where bends such as that shown in FIG. 15 are concerned, as the radius of the bends required is different for each conductor. This longitudinal sliding within the channels allows each conductor to progress to the least stressed position, and thereby best ensure that the bend is uniform. This absence of kinking and distortion of the conductors minimises any risk of degrading the conductor's mechanical performance—due to, for example, point loading—and electrical performance—due to, for example, creating a reflection site for high frequency signals.

Although FIG. 15 illustrates the exposed conductors as they extend between adjacent conduits 1, in practice an intermediate corner conduit or bend conduit is used to provide continuous encasement of conductors 2, 3 and 4.

Figure 31:
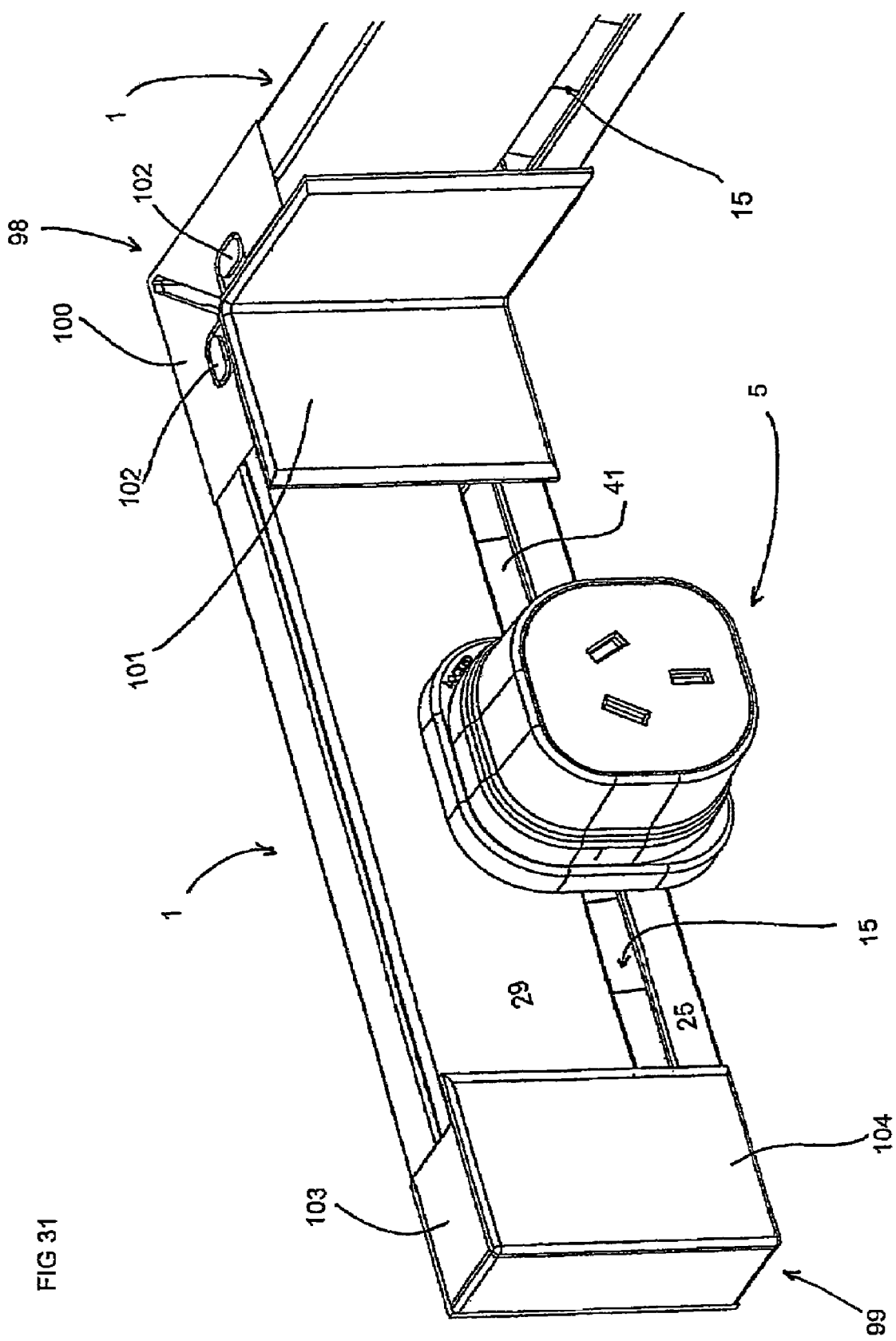
FIG. 31 is a perspective view of the conduit of FIG. 15 with a corner conduit and an end cap installed.

FIG. 31 is a perspective view illustrating an intermediate corner conduit 98 and a conduit end cap 99. The conduit 98 comprises a rear housing 100 and a front plate 101 secured to the housing 100 using pins 102. The cap 99 comprises a rear housing 103 and a front plate 104.

Figure 32:
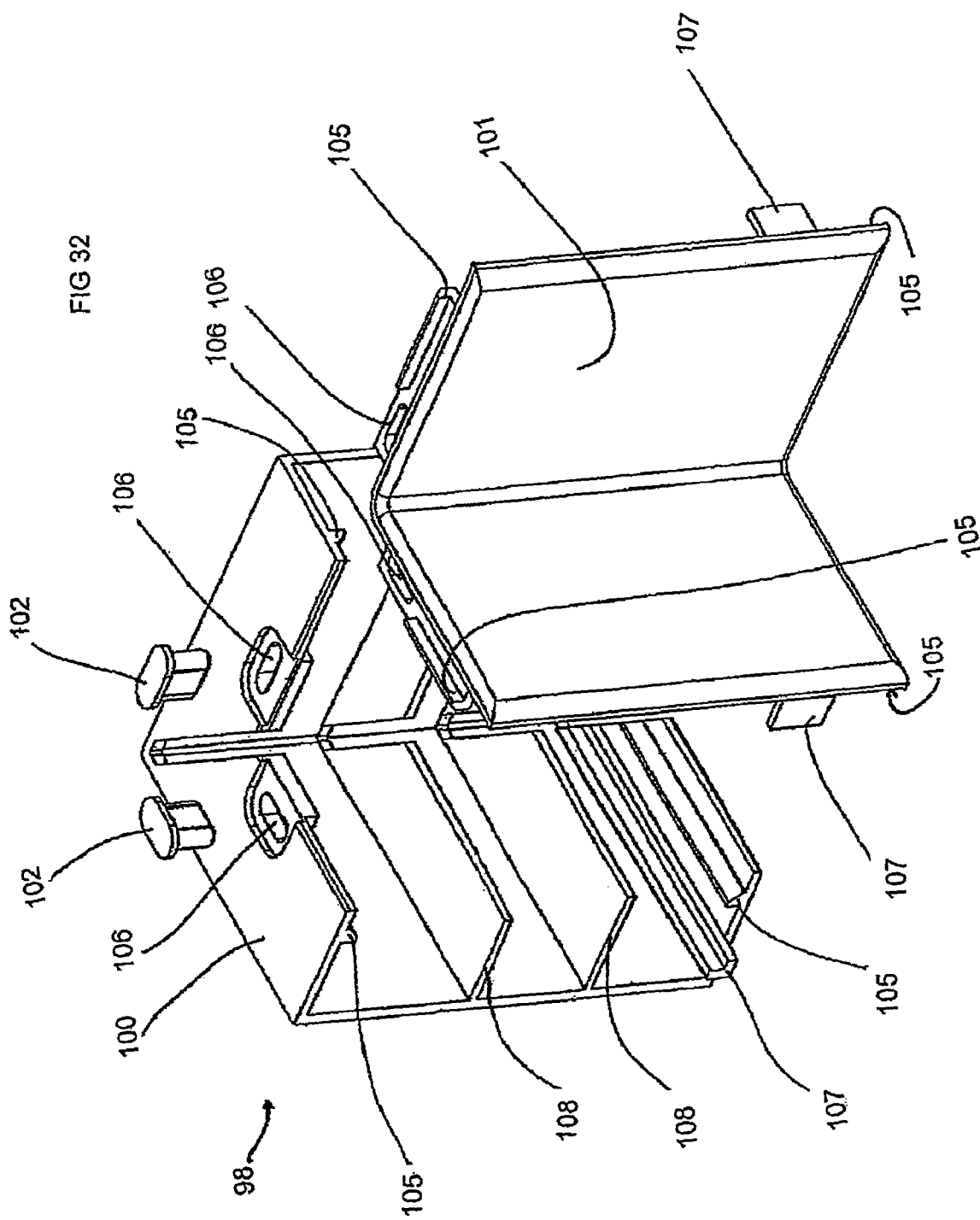
FIG. 32 is an exploded perspective view of the corner conduit of FIG. 31.

FIG. 32 is a perspective exploded view of the conduit 98. The housing 100 comprises two open fronted substantially identical halves arranged at right angles to each other and with external cross-sectional dimensions that correspond to those of the conduit 1. The plate 101 comprises two halves arranged at right angles that are the same height as the conduit 1 and arranged to cover the forward open face of the housing 100 and to overlap the joint with the plate 29 of the conduit 1. The upper and lower edges of the housing 100 and the plate 101 carry snap lock fittings 105 to engage the housing 100 and plate 101. The upper face of the housing 100 and the plate 101 each define two sockets 106 which collocate when the plate 101 is installed on the housing 100 so that the pins 102 can be inserted in the sockets 106 to further secure the plate 101 to the housing 100.

The housing 100 and the plate 101 each bear two tabs 107. The tabs 107 on the housing 100 are arranged to engage in the end of the conduit 1 while the tabs 107 on the plate 101 are arranged to engage in the opening 15. The engagement of the tabs 107 of the conduit 1 with the conduit 100 hold the two securely together. The housing 100 includes two longitudinally extending ribs 108 that protrude forward from the back wall of the housing. The ribs 108 are arranged, when the conduit 100 is installed, to provide support for the conductors 2, 3, 5 and to provide electrical insulation between the upper and lower conductors. Insulation between each of the lower or upper conductors is provided by separate interposed insulating elements (not shown). The conduit 100 described above is arranged for use with a right angle corner. In other embodiments corner conduits for other corner angles are provided including internal and external corners and curved corners of different radii.

FIG. 33 is a perspective exploded view of the end cap 99. The housing 103 comprises a box with an open front and side having external cross-sectional dimensions that correspond to those of the conduit 1. The plate 104 comprises two halves arranged at right angles that are the same height as the conduit 1 and arranged to cover the open side and front of the housing 103 and to overlap the joint with the plate 29 of the conduit 1. The housing 103 and the plate 104 carry snap lock fittings 105 (not shown on the plate 104) arranged to engage the housing 103 and plate 104. The rearward face of the housing 103 defines a hole 109 though which a bolt 110 can be entered to secure the cap 99 to the carrying surface. The cap 99 serves to seal off and insulate the open end of the conduit 1 and the conductors 2, 3, 4.

Bending and folding of conductors 2, 3 and 4 about the vertical axis is possible due to the substantially planar sheets 61, and the spaced apart ribs 66. It will be appreciated that such bending or folding does, in some cases, result in some buckling of segments 70 and ribs 66. While this is preferable avoided, it has been found in practice that this is not critical for domestic power applications as sheet 61 is the main current carrier. In circumstance where more extreme bending or folding is used, it is also possible to buckle sheet 61 or to bring sheet 61 into engagement with ribs 66. In the event that the conductors need only convey power, and not communications signals, then such buckling is rarely problematic, as assembly 5 is typically only mounted to conduit 1, not to an intermediate conduit.

Conductors 2, 3 and 4 are introduced into the respective channels by being feed into the longitudinal ends of conduit 1. However, in other embodiments, the conductors are introduced into respective channels 12, 13 and 14 by progressing through the open ends, in that they are resiliently deformed as they past ridges 35 and 36. The typical end result being, for the example of conductor 2, that edge 65 and end 67 are adjacent to the upper side of ridges 35 and 36. Due to manufacturing tolerances and other factors it is not unusual for only one of edge 65 and end 67 to be engaged with the respective ridges. In fact, this is a design feature of conduit 1 and conductor 2 to ensure that sheet 61 is inclined from the plane through which pin 7 rotates. As will be appreciated from the foregoing description, in this embodiment pin 7 rotates in a vertical plane.

While conductors 2, 3 and 4 are retained within the respective channels, they do have a limited degree of freedom for movement. Particularly, the inclusion and placement of recess 55 encourages conductor 2, in the absence of pin 7, to rest under the influence of gravity such that sheet 61 is inclined by a small amount from the vertical. The inclination is such that end 67 is lower than edge 65. When pin 7 is first progressed past ridges 35 and 36 and into channel 12, its leading edges contact conductor 2. Specifically, one leading edge of pin 7 contacts surfaces 62 adjacent to edge 65, and the other leading edge contacts surface 72. Those contacts need not necessarily initially occur simultaneously. While this action of pin 7 may cause some upward movement of conductor 2, the contact with surface 62 causes conductor 2 to rotate slightly within channel 12 such that face 63 is brought into engagement with abutment 37. The engagement with abutment 37 occurs adjacent to edge 64 and, as such, sheet 61 is supported along face 63 at only two spaced apart points, these being at edge 64—which is engaged with abutment 37—and at edge 65—that is abutted against the adjacent wall of channel 12. Accordingly, sheet 61 and surface 62 remain inclined with respect to the vertical.

As pin 7 is further advanced into channel 12, it drives between surface 62 and face 72 to resiliently deform ribs 66 such that surfaces 62 and 68 are moved apart to allow progression of pin 7 into channel 12. As that progression occurs, the leading edge of pin 7 that is engaged with surface 62 slideably progresses along that surface toward edge 64. Moreover, that leading edge, being disposed intermediate edges 64 and 65, resiliently deforms sheet 61 toward the adjacent wall of channel 12 to further facilitate the movement apart of surfaces 62 and 68.

Once the leading edges of pin 7 have progressed from end 67 and past surface 68, the deformation of sheet 61 is such as to bring surface 62 into contact with the adjacent surface of pin 7. In any event, once the leading edges of pin 7 extend to or slightly beyond edge 64, sheet 61 returns to the substantially planar configuration to establish the large contact area between the pin and surface 62.

During the progression of pin 7 into channel 12, ribs 66 are deformed to make way for that progression between surfaces 62 and 68. However, the ribs maintain surfaces 62 and 68 in a resilient clamping bias with pin 7. While sheet 61 is being resiliently deformed the bias will be reduced. However, with pin 7 in the operative position, and surface 62 intimately electrically connected with that pin, the bias will be at a maximum as sheet 61 is, in that configuration, substantially planar and un-deformed.

Channel 12 and conductor 2 also interact such that end 67 of conductor 2 is abutted with the adjacent wall of the channel during the progression of pin 7 into the channel. Additionally, recess 55 ensures that rib 66 does not otherwise engage with that wall of the channel. In this situation, end 67 acts as a lever for applying additional clamping bias between surfaces 62 and 68 and the intermediate pin 7. It also enhances the probability of a large contact surface area between surface 62 and pin 7. An additional advantage is that the ribs adjacent to the rib or ribs that directly engage with pin 7 are resiliently urged toward sheet 61 and thereby contribute to locking pin 7 in the operative position.

When pin 7 is rotated from the operative to the movable configuration it is necessary to overcome the clamping and locking forces that have been applied by conductor 2. However, once this occurs, the sequence of events is substantially the reverse order of that described above.

Figure 14:
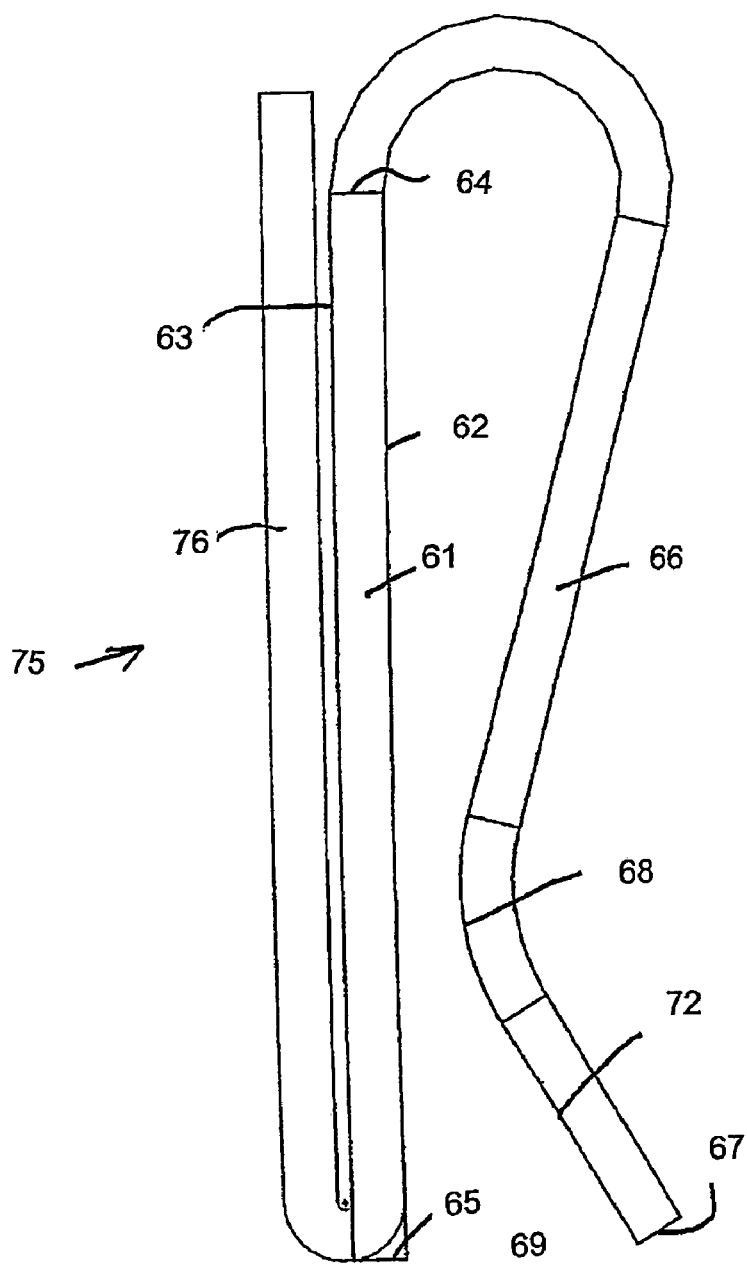
FIG. 14 is a side view, similar to FIG. 11, of a high current rated conductor according to the invention.

Some embodiments of the invention are intended for high current applications. One example is a conductor 75 that is illustrated in FIG. 14, where corresponding features are denoted by corresponding reference numerals. Sheet 61 includes a conductive copper strip 76 that is integrally formed with and which extends from edge 65 to overlap with all of face 63. In this embodiment strip 76 extends beyond edge 64. Although a gap is shown between sheet 61 and strip 76, it is preferred that this is minimised or eliminated.

In other embodiments, strip 76 terminates intermediate edges 64 and 65. In further embodiments, strip 76 is folded back upon itself one or more times.

Conductors 2, 3 and 4 are each formed from a continuous conductive sheet. By way of example, a preferred method of manufacturing conductor 2 will be provided below with reference to FIG. 16. It will be appreciated by those skilled in the art that the other conductors are preferably manufactured with the same steps.

Initially, use is made of a longitudinally continuous copper sheet 81 having a nominal thickness and width of about 0.35 mm and 18 mm respectively. This is sufficient to provide, in the finished product, a 20 Amp current carrying capacity at 240 Volts AC, along with the required clamping force.

Sheet 81 is significantly smaller than the corresponding sheet used to produce the prior art device. Accordingly, the raw material costs for the preferred embodiment, for the same current carrying capacity, is considerably less than that offered by the prior art. It also ensures, that for a given length of conductor, that conductor 2 will weigh less than the prior art and, hence, will be less expensive to not only obtain the raw materials, but also to transport the final product for installation.

Figure 16:
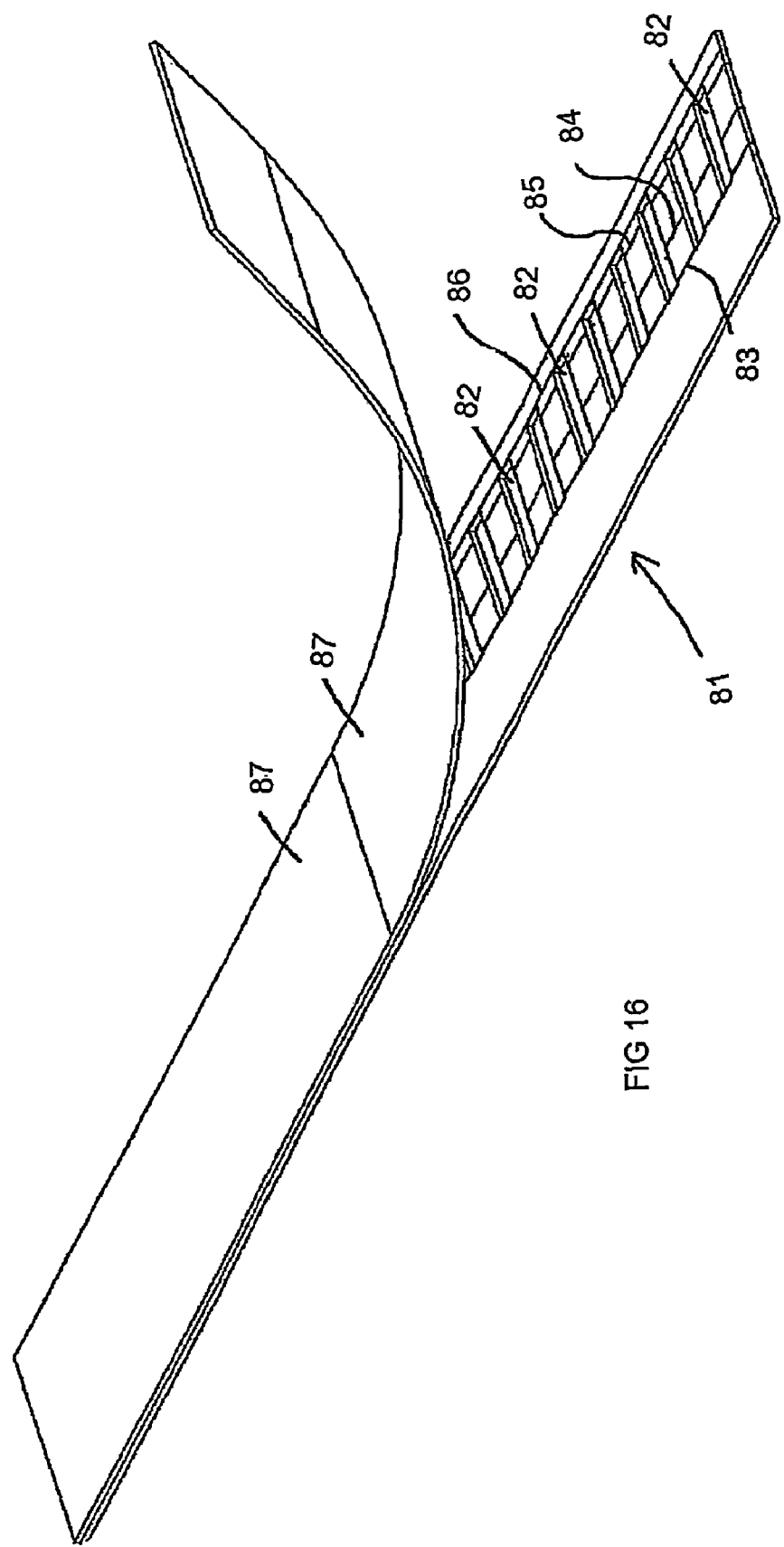
FIG. 16 is a perspective view of the conductor at an intermediate stage of its manufacture.

This sheet is cleaned and then punched to form an array of asymmetric disposed longitudinally spaced apart generally rectangular apertures 82. This arrangement is illustrated in FIG. 16. The punching operation also introduces four parallel broken lines of weakness 83, 84, 85 and 86 that extend longitudinally between the apertures. It will be appreciated that the metal remaining between adjacent apertures is to ultimately define ribs 66.

Sheet 81 is then again cleaned and a flexible plastic sheet 87 is adhered to one face of sheet 81. As sheet 81 is of considerable length, it is usual for a plurality of adjacent sheets 87 being used to collectively cover upward face of sheet 81. Sheet 87, in this embodiment, is made from a flexible resilient plastic sheet and:

1. Provides an electrically insulating and protective cover for the resultant conductor.
2. Facilitates the introduction of the conductor into channel 12 by reducing the likelihood of inadvertent and undesired binding engagement between the ribs and the adjacent channel walls.
3. Provides additional structural integrity to the conductor.
4. Contributes to the formation of constant radius curves between adjacent conductors that are angled with respect to each other.
5. Reduces the risk of entanglement or undesired snagging between adjacent coils of the resultant conductor when included in a multi-layer coil.

In other embodiments, sheet 87 is a laminate. One embodiment (not shown) includes a three layer flexible laminate having:

1. An outer plastic layer for providing the functionality referred to above;
2. An inner adhesive layer for adhering sheet 87 to conductor 2.
3. An intermediate conductive layer, such as a conductive foil, for providing electromagnetic shielding.

Sheet 81 is mandrel bent between lines 85 and 86 to define end 67 and the inclined face 72. A further mandrel bend is affected along a longitudinal central fold line that is parallel with and intermediate lines 83 and 84. The bend along the central fold line is such as to fold sheet 81 by 180° so that it extends back upon itself to form conductor 2, as shown in FIG. 11. It will be appreciated that sheet 87 have been omitted from the drawings, other than FIG. 16, for the purposes of clarity.

In other embodiments, sheet 87 is not used.

Other punching, bending and folding techniques are also applicable to the manufacture of conductor 2 from sheet 81.

The punching technique used in the embodiments described in the drawings results in about 17% of copper sheet 81 being converted to waste. That is, conductor 2 includes about 83% of the weight of copper originally included in sheet 81. For the prior art, the waste amounted to about 30% of the weight of the resultant conductor.

Figure 13:
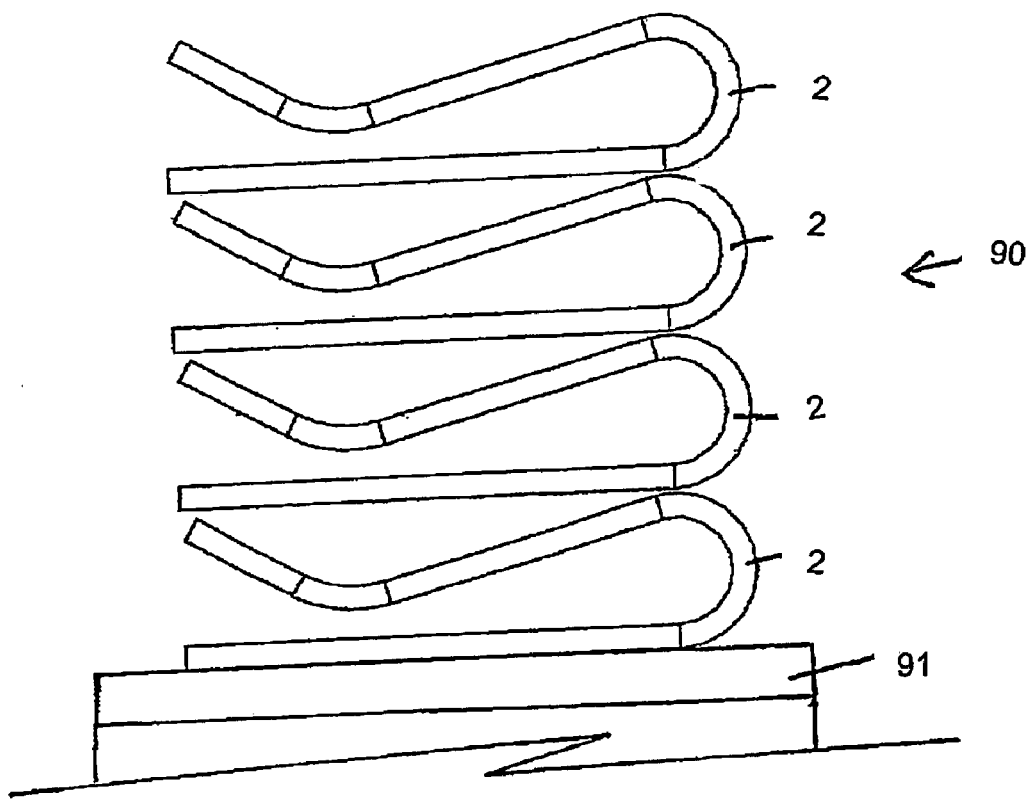
FIG. 13 is a cross sectional view of a roll of conductors of FIG. 11.

Once sheet 81 has been formed into conductor 2, it is wound into a multi-layer coil 90, as shown in FIG. 13. The coil is subsequently transported to a building site or other installation site where it is progressively uncoiled as conductor 2 is feed into channel 12. Coil 90 is formed by securing an end of conductor 2 to a circular drum 91. Drum 91 has an outwardly facing circumferentially extending surface 92 that is abutted with face 63 of conductor 2. Drum 91 is rotated to wind conductor 2 about the drum and then over its own length to form coil 90. As the coil is created, the substantially planar face 63 is being engaged with the underlying drum of coil. Accordingly, the risk of inadvertent engagement between ribs in adjacent coils of the multi-layer coil 90 is minimised both during the coiling and uncoiling of conductor 2.

The shape and configuration of conductors 2, 3 and 4 provides for a small transverse width of those conductors, as there are only two transversely spaced apart copper components, these being body 61 and ribs 66. Moreover, the sheet 81 is only folded back upon itself once. Even in the FIG. 14 embodiment, where sheet 81 is folded back upon itself twice, the additional fold is such that the two components of the sheet are either closely adjacent or abutted together.

Some prior art conductors include considerably more transversely spaced components, typically four, and are therefore require more material to make, are more difficult to make, and are transversely wider. It is also more usual for the prior art conductors to include many folds back upon its length. The conductors of the present embodiments, however, are minimally transversely wider than the respective pin that they are intended to engage. This allows conduit 1 to be: thinner; less intrusive in retrofit installations; and installed in smaller cavities or spaces that would have been achieved through use of the prior art referred to above.

Other advantages of the preferred embodiments are that they provide for:

1. A reduction in the cost of: the required raw materials; the manufacture; the handling and transportation; and the installation. As presently understood, the total cost of purchase and installation of the preferred embodiment of FIG. 15 should be about half that of an equivalent prior art system.
2. A reduction in the amount of waste generated from the production of the conductor.
3. Increased safety through the provision of closures, and in particular closure 39.
4. The earth contact to be the first to contact, and the last to leave contact, with the respective conductor.
5. A reduced number of components, particularly for conduit 1. In the preferred embodiment, with the exception of conductors 2, 3 and 4, conduit 1 includes only three components, these being bracket 21, bracket 28 and closure 39. However, in embodiments where closure 39 is integrally formed with bracket 21, conduit 1 includes only two components.
6. A reduction in the installation time and the logistics in arranging for that installation due to the fewer required components. That is, separate components need to be separately sourced, cut to size and assembled. Accordingly, the far diminished number of components required by the present embodiments facilitates the installation of conduit 1.
7. Accommodates longitudinal progression of the conductors within the respective channels. This reduces point loading of the conductors and allows for uniform bends to be formed by those conductors as they extend between conduits.

As will be understood by those skilled in the art, the electrical insulation provided the conduit and the dimensions and materials of the pins and conductors used in embodiments of the invention are designed to take into account the voltages and currents with which they are used. Higher voltages will require greater insulation and higher currents will require more substantial conductors and pins.

Although the invention has been described with reference to specific examples, it will be appreciated by those skilled in the art that it may be embodied in many other forms.

The invention claimed is:

1. An elongate electrical conductor that is adapted for electrically connecting with an electrical contract assembly, the conductor including:
   a plurality of parallel elongate electrical conductor members that are each adapted for electrically connecting with a respective electrical contact provided by a common electrical contact assembly, each conductor member including:
      a longitudinally extending elongate first body for defining a substantially planar contact surface and an opposite face wherein the first body includes first and second opposite longitudinally extending edges; and
      a longitudinally extending elongate second body in electrical communication with the first body and extending transversely away from the first edge back along substantially all of the planar contact surface for defining a second contact surface that is opposed with the planar surface intermediate the first and the second edges, wherein the second body does not extend along or transversely beyond the opposite face, wherein, upon rotational progression of the contact between the first and second bodies, the planar and the second surfaces are resiliently biased into engagement with the contact;
   a longitudinally extending conduit, the conduit including:
      a housing;
      a plurality of longitudinally extending and transversely spaced apart channels disposed within the housing, each for captively retaining a respective one of the conductor members, each channel including a respective like facing open end for receiving a respective one of the contacts; and
      an elongate longitudinally extending opening for receiving the common electrical contact assembly and allowing the contact assembly to be rotated thereby to progress respective ones of the contacts between the first and second bodies of respective conductor members.

2. An elongate electrical conductor according to claim 1 in which, for at least one conductor member, the planar contact surface is continuous and the second contact surface is segmented.

3. An elongate electrical conductor according to claim 1 in which, for at least one conductor member, the second contact surface is arcuate.

4. An elongate electrical conductor according to claim 1 in which the, for at least one conductor member, adjacent free ends are mechanically connected along the length of the conductor to collectively increase the resilient bias.

5. An elongate electrical conductor according to claim 1 in which, for at least one conductor member, the second body is arcuate and includes opposite convex and a concave faces, the former defining the arcuate contact surface.

6. An elongate electrical conductor according to claim 1 in which each conductor member is flexible to accommodate bending or folding about a vertical axis.

7. An elongate electrical conductor according to claim 1 in which, for at least one conductor member, the body includes a further conductive strip that extends from the second edge for use in high current applications.

8. An elongate electrical conductor according to claim 1 in which, for at least one conductor member, the adjacent free ends are mechanically connected by respective intermediate integrally formed segments, such that the segments collectively define with the free ends a continuous engagement face along the length of the conductor members for guiding the progression of the contacts respectively into biased engagement with the first and second surfaces.

9. An elongate electrical conductor according to claim 8 in which, for at least one conductor member, the engagement face is opposed with and inclined away from the first surface.

10. An elongate electrical conductor according to claim 8 in which, for at least one conductor member, the engagement face extends between an inner edge and an outer edge that terminates opposite the other edge such that when the first and second surfaces are biased into engagement with the contact upon full rotational progression of the contact, the inner edge abuts the contact.

11. An elongate electrical conductor according to claim 1 in which, for at least one conductor member, the second body includes a plurality of longitudinally spaced apart ribs that extend from the first body to respective free ends which collectively define the second surface.

12. An elongate electrical conductor according to claim 11 in which, for at least one conductor member, upon full rotational progression of the contact, one or more ribs are electrically connected to the contact and the adjacent ribs to each side of the contact the ribs restrain longitudinal movement of the contact.

13. An elongate electrical conductor according to claim 1 in which, for at least one conductor member, the first body provides a primary current carrying component of the conductor having a low resistance current path and the second body provides a relatively higher resistance current path.

14. An elongate electrical conductor according to claim 13 in which, for at least one conductor member, the second contact surface is arcuate for optimising the electrical engagement of the contact with the planar contact surface upon progression of the contact between the first and second bodies.

15. An elongate electrical conductor according to claim 13 in which, for at least one conductor member, the second body includes a plurality of longitudinally spaced apart ribs that extend from the first body to respective free ends which collectively define the second surface, the free ends being mechanically interconnected by respective intermediate integrally formed segments to provide the relatively higher resistance current path.

16. An elongate electrical conductor according to claim 1 in which each conductor member is configured to be longitudinally fed into a complementary elongate conduit.

17. An elongate electrical conductor according to claim 16 in which each conductor member is configured to be longitudinally fed into two complementary elongate conduits that extend normally away from each other.

18. A power distribution component according to claim 1 including the common contact assembly.

19. A power distribution component according to claim 18 wherein, upon rotation of the contact assembly, the electrical contacts move into engagement with the respective conductors in a predetermined sequence.

20. An elongate electrical conductor member for use in a track-based power distribution arrangement wherein the conductor is contained in an elongate insulating conduit, the conductor being adapted for electrically connecting with an electrical contact when disposed in the conduit, the conductor member including:
  a longitudinally extending elongate body for defining a first contact surface and a face opposite the first contact surface; and
  a plurality of longitudinally spaced apart resilient ribs that are electrically connected to and extend transversely away from the body to respective free ends that are spaced apart from the first contact surface for allowing the contact to be rotationally progressed between the body back along substantially all of the first contact surface and and a plurality of the ribs, each rib including a respective second contact surface that is opposed with the first surface wherein, upon rotational progression of the contact between the body and the a plurality of ribs, wherein the resilient ribs do no extend along or transversely beyond the opposite face the first surface and the respective one or more second surfaces are resiliently biased into engagement with the contact.

21. An elongate electrical conductor including:
  a plurality of parallel elongate electrical conductor members that are each adapted for electrically connecting with a respective electrical contact, each conductor member including:
    a longitudinally extending elongate first body for defining a substantially planar contact surface and an opposite face; wherein the first body includes first and second opposite longitudinally extending edges and
    a longitudinally extending elongate second body in electrical communication with the first body and extending transversely away from the first edge back along substantially all of the planar contact surface for defining a second contact surface that is opposed with the planar surface intermediate the first and the second edges, wherein the second body does not extend along or transversely beyond the opposite face, wherein, upon rotational progression of the electrical contact between the first and second bodies, the planar and the second surfaces are resiliently biased into engagement with the electrical contact;
  a longitudinally extending conduit, the conduit including:
    a housing;
    a plurality of longitudinally extending and transversely spaced apart channels disposed within the housing, each for captively retaining a respective one of the conductor members, each channel including a respective like facing open end for receiving a respective one of the electrical contacts; and
    an elongate longitudinally extending opening; and
  a contact assembly that is insertable into the longitudinally extending opening, the contact assembly including a plurality of said electrical contacts, wherein upon movement of the contact assembly from a first configuration to a second configuration the electrical contacts each rotationally progress to a position between the first and second bodies of respective ones of the conductor members.

22. An elongate electrical conductor member for use in a track-based power distribution arrangement wherein the conductor is contained in an elongate insulating conduit, the conductor being adapted for electrically connecting with an electrical contact when disposed in the conduit, the conductor member including: a longitudinally extending elongate first body for defining a substantially planar contact surface and an opposite face, wherein the first body includes first and second opposite longitudinally extending edges; and a longitudinally extending elongate second body in electrical communication with the first body and extending transversely away from the first edge back along substantially all of the planar contact surface for defining a second contact surface that is opposed with the planar surface intermediate the first and the second edges, wherein the second body does not extend along or transversely beyond the opposite face, wherein, upon rotational progression of the electrical contact between the first and the second bodies, the planar and the second surfaces are resiliently biased into engagement with the electrical contact.

* * * * *

UNITED STATES PATENT AND TRADEMARK OFFICE
CERTIFICATE OF CORRECTION

PATENT NO.        : 7,585,175 B2                               Page 1 of 1
APPLICATION NO.   : 10/539655
DATED             : September 8, 2009
INVENTOR(S)       : John Ashton Sinclair et al.

It is certified that error appears in the above-identified patent and that said Letters Patent is hereby corrected as shown below:

In claim 1, column 21, line 31, delete "contract" and insert -- contact --.

In claim 20, column 23, line 29, after "body", insert -- back along substantially all of the first contact surface and --.

In claim 20, column 23, beginning on line 32, after "body", delete "back along substantially all of the first contact surface and".

In claim 20, column 23, line 32, after "ribs", insert -- wherein the resilient ribs do not extend along or transversely beyond the opposite face --.

In claim 20, column 23, line 36, after "and the", delete "a".

In claim 20, column 23, lines 37 and 38, delete "wherein the resilient ribs do no extend along or transversely beyond the opposite face".

Signed and Sealed this

Thirteenth Day of October, 2009

David J. Kappos
*Director of the United States Patent and Trademark Office*